(12) United States Patent
Rode et al.

(10) Patent No.: US 9,895,779 B2
(45) Date of Patent: Feb. 20, 2018

(54) RADIAL SPRINGS AND METHODS OF INSTALLING AND UNINSTALLING RADIAL SPRINGS

(71) Applicant: TEMPER AXLE PRODUCTS CORPORATION, Fonda, NY (US)

(72) Inventors: John E. Rode, Fonda, NY (US); Sean E. Strait, Fonda, NY (US)

(73) Assignee: TEMPER AXLE PRODUCTS CORPORATION, Fonda, NY (US)

( * ) Notice: Subject to any disclaimer, the term of this patent is extended or adjusted under 35 U.S.C. 154(b) by 0 days.

(21) Appl. No.: 14/677,134

(22) Filed: Apr. 2, 2015

(65) Prior Publication Data
US 2015/0292584 A1    Oct. 15, 2015

Related U.S. Application Data

(60) Provisional application No. 61/978,162, filed on Apr. 10, 2014.

(51) Int. Cl.
| | | |
|---|---|---|
| *F16J 9/00* | (2006.01) | |
| *B23P 19/04* | (2006.01) | |
| *B23P 19/08* | (2006.01) | |
| *B25B 27/00* | (2006.01) | |
| *F16F 1/02* | (2006.01) | |

(52) U.S. Cl.
CPC .......... *B23P 19/048* (2013.01); *B23P 19/084* (2013.01); *B25B 27/00* (2013.01); *F16F 1/025* (2013.01)

(58) Field of Classification Search
CPC ...... F16J 9/20; F16J 9/063; F16J 9/064; F16J 9/066; F16J 9/203; F16J 9/206; F16F 1/34; F16F 1/182; F16F 1/328; F16F 1/3732; F16F 1/376; F16F 1/377; F16F 1/3873

See application file for complete search history.

(56) References Cited

U.S. PATENT DOCUMENTS

| 2,025,334 | A | * | 12/1935 | Teetor | ...................... F16J 9/063 267/1.5 |
|---|---|---|---|---|---|
| 2,025,335 | A | | 12/1935 | Brannan | |
| RE19,900 | E | | 3/1936 | Krebs | |

(Continued)

*Primary Examiner* — Bradley T King
*Assistant Examiner* — Stephen M Bowes
(74) *Attorney, Agent, or Firm* — Heslin Rothenberg Farley & Mesiti, PC; Victor Cardona, Esq.

(57) ABSTRACT

The present disclosure provides radial springs that control radial forces between adjacent concentric components. The radial springs may be configured for placement between the adjacent concentric components. The radial springs may include a base member, support members extending from the base member, and resilient members extending from the base members. The resilient members may extend radially, axially, at an angle relative to the axis, or a combination thereof, and may be radially deformable. The resilient members may exert radial forces substantially uniformly radially inward or outward in use. The resilient members may be leaf type members or cantilever type members. The support members and resilient members may be provided on a radially inward or outward side of the base member. The methods of installing and uninstalling radial springs may include engaging the resilient members with a tool and radially deforming the resilient members to engage or disengage the radial spring from an adjacent concentric component.

18 Claims, 37 Drawing Sheets

(56) References Cited

U.S. PATENT DOCUMENTS

| | | | |
|---|---|---|---|
| 2,044,451 A | | 6/1936 | Teetor |
| 2,044,453 A | * | 6/1936 | Troendly ................ F16J 9/063 |
| | | | 267/1.5 |
| 2,104,225 A | | 1/1938 | Given |
| 3,190,662 A | | 6/1965 | Mayfield |
| 3,718,900 A | * | 2/1973 | Holmes, Jr. ............ G01V 1/181 |
| | | | 267/161 |
| 4,914,949 A | * | 4/1990 | Andra ................ F16F 15/1202 |
| | | | 464/87 |
| 5,032,028 A | | 7/1991 | Riazuelo et al. |
| 5,427,455 A | | 6/1995 | Bosley |
| 5,962,855 A | | 10/1999 | Frederick et al. |
| 6,837,345 B1 | * | 1/2005 | Lauble .................... F16F 1/371 |
| | | | 188/378 |
| 7,170,061 B2 | | 1/2007 | Clarke et al. |
| 2002/0014731 A1 | * | 2/2002 | Palinkas ............ B60G 21/0551 |
| | | | 267/276 |
| 2011/0014036 A1 | * | 1/2011 | Boening .................. F02C 6/12 |
| | | | 415/177 |

\* cited by examiner

RADIAL SPRINGS AND METHODS OF INSTALLING AND UNINSTALLING RADIAL SPRINGS

CROSS REFERENCE TO RELATED APPLICATION

This application is a Non-Provisional of U.S. Provisional Application No. 61/978,162, filed on Apr. 10, 2014, and titled "Radial Springs and Methods of Installing and Uninstalling Radial Springs," the entirety of which is expressly incorporated herein by reference.

BACKGROUND

The present disclosure generally relates to radial springs, and in particular to radial springs that control forces between concentric components.

Many mechanical or electromechanical applications include two or more overlapping or concentrically arranged components. For example, bearings, spacers, o-rings, seals or other members or devices may be positioned concentrically with, or between, one or more substantially rigid circular or cylindrical member or surface of a device. As another example, two substantially rigid cylindrical members or surfaces of a device may be concentrically arranged. During use of such devices, the concentric components may exert a force against each other. For example, the inner member may provide a force against outer member, or the outer member may exert a force against the inner member.

Forces between concentrically arranged components or surfaces may result from any number of causes. For example, the coefficient of thermal expansion of the inner member and the outer member may differ such that heat produced during use of the device expands the inner and outer members at different rates. As another example, an external force occurring or produced during use of the device may act on one of the inner and outer members. Such force may then be transferred from one member to the other. Further, such forces may be multiplied by the presence of a third concentric component. For example, a third component may be arranged concentrically with the first and second component such that the first component is positioned intermediate to the second and third components. In such embodiments, forces may be produced via any of the first, second and/or third components.

Forces between concentrically arranged members or surfaces, such as radial forces, may be detrimental to the functioning of the device and/or damage at least one of the inner or outer concentric members. For example, the inner or outer concentric member may be a bearing, and the other of the inner or outer concentric member may be a cylindrical member or surface positioned concentrically exterior or interior to the bearing. If the bearing and other member include different coefficients of thermal expansion, heat produced during use may cause the bearing and the other member to bind against each other—ultimately resulting in the bearing becoming deformed and faulty. As yet another example, a third concentric member may be positioned exterior or interior to the bearing such that the bearing is intermediate second and third concentric members. During use, the second and/or third concentric member may exert a radial force, such as a radial shock force, against the bearing. The bearing may thereby be forced against the other of the second or third concentric member and deformed or otherwise damaged.

As a result, a need exists for radial springs that control, prevent, limit or otherwise manage forces, such as radial forces, between concentric or overlapping components to ensure proper use of the components and prevent damage to the components.

BRIEF DESCRIPTION

In one aspect, the application provides for a radial spring for controlling radial forces between first and second concentric components. The radial spring may include a base portion, at least one support portion extending from the base portion, and a plurality of resilient member portions extending from the at least one support portion. The base portion, support portion and plurality of resilient member portions may be formed about an axis. The plurality of resilient member portions may be resiliently deformable along a radial direction.

In some embodiments, the base portion may include a first engagement surface for engaging the first component. In some embodiments, the plurality of resilient member portions may each include a second engagement surface for engaging the second component. In some embodiments, the first engagement surface and second engagement surfaces may be substantially opposing surfaces along the radial direction. In some embodiments, the first engagement surface may substantially face outwardly or inwardly with respect to the axis along the radial direction, and the second engagement surface may substantially face the other of outwardly or inwardly with respect to the axis along the radial direction.

In some embodiments, the plurality of resilient member portions may be spaced about the axis. In some embodiments, the at least one support portion may extend radially from the base portion. In some embodiments, each of the plurality of resilient member portions may extend from the at least one support portion in a direction substantially parallel to the axis. In some embodiments, the at least one support portion may include a plurality of support portions spaced about the axis, and each of the plurality of resilient member portions may extend from at least one of the at least one support portion at an angle relative to the axis. In some embodiments, each of the plurality of resilient member portions may extend between two adjacent support portions. In some embodiments, each of the plurality of resilient member portions may extend from a support portion and defines a free end. In some embodiments, each support portion may include a pair of the plurality of resilient member portions extending in opposing directions. In some embodiments, each support portion may include only one resilient member portion extending therefrom.

In some embodiments, each of the plurality of resilient member portions may extend from a medial portion in the radial direction of the at least one support portion. In some embodiments, each of the plurality of resilient member portions may include a radially extending portion. In some embodiments, each of the radially extending portions of the plurality of resilient member portions may define a second engagement surface for engaging the second component.

In some embodiments, the base portion may include a plurality of axially-extending apertures that are spaced about the axis. In some embodiments, the radial spring may include a plurality of ring segments comprising the base portion, support portion and plurality of resilient member portions. In some embodiments, the plurality of ring segments may form a ring shape when combined. In some embodiments, the radial spring may be ring-shaped. In some embodiments, the radial spring may be of one-piece construction.

In another aspect, the disclosure provides a device for installing or uninstalling a radial spring including resiliently deformable members. The device includes an inner cylindrical member including a pin and first axially extending portions extending from a first free end of the inner cylindrical member. The device further includes outer cylindrical member concentric with the inner cylindrical member and including a shaped aperture and second axially extending portions extending from a second free end of the outer cylindrical member. The pin of the inner cylindrical member is positioned within the shaped aperture of the outer cylindrical member. The shaped aperture includes a circumferentially extending portion and an axially extending portion.

In some embodiments, the radial spring may include a plurality of apertures, and the first axially extending portions of the inner cylindrical member may be configured to mate with the plurality of apertures of the radial spring. In some embodiments, the resiliently deformable members of the radial spring may extend from support portions of the radial spring, and the device may be configured such that when the first axially extending portions are mated with the plurality of apertures of the radial spring, the second axially extending portions of the outer cylindrical member abut the resiliently deformable members substantially proximate the support portions.

In another aspect, the disclosure provides a method of controlling radial forces between first and second concentric components. The method includes obtaining a radial spring including a base portion, at least one support portion extending from the base portion, and a plurality of resilient member portions extending from the support portion. The base portion, support portion and plurality of resilient member portions are formed about an axis and form an internal aperture. The plurality of resilient member portions are resiliently deformable along a radial direction. The method may further include elastically deforming the plurality of resilient member portions along a radial direction. The method may further include positioning the radial spring concentrically between the first and second concentric components. The method may further include releasing at least a portion of the elastic deformation of the plurality of resilient member portions such that the plurality of resilient member portions engage one of the first and second concentric components.

In some embodiments, positioning the radial spring concentrically between the first and second concentric components may include positioning the radial spring at least partially within a groove of one of the first and second concentric components. In some embodiments, the resilient member portions may engage the groove.

These and other objects, features and advantages of this disclosure will become apparent from the following detailed description of the various aspects of the disclosure taken in conjunction with the accompanying drawings.

DRAWINGS

DETAILED DESCRIPTION

Each embodiment presented below facilitates the explanation of certain aspects of the disclosure, and should not be interpreted as limiting the scope of the disclosure. Moreover, approximating language, as used herein throughout the specification and claims, may be applied to modify any quantitative representation that could permissibly vary without resulting in a change in the basic function to which it is related. Accordingly, a value modified by a term or terms, such as "about," is not limited to the precise value specified. In some instances, the approximating language may correspond to the precision of an instrument for measuring the value. When introducing elements of various embodiments, the articles "a," "an," "the," and "said" are intended to mean that there are one or more of the elements. The terms "comprising," "including," and "having" are intended to be inclusive and mean that there may be additional elements other than the listed elements. As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances, the modified term may sometimes not be appropriate, capable, or suitable. Any examples of operating parameters are not exclusive of other parameters of the disclosed embodiments. Components, aspects, features, configurations, arrangements, uses and the like described, illustrated or otherwise disclosed herein with respect to any particular embodiment may similarly be applied to any other embodiment disclosed herein.

Figure 1:
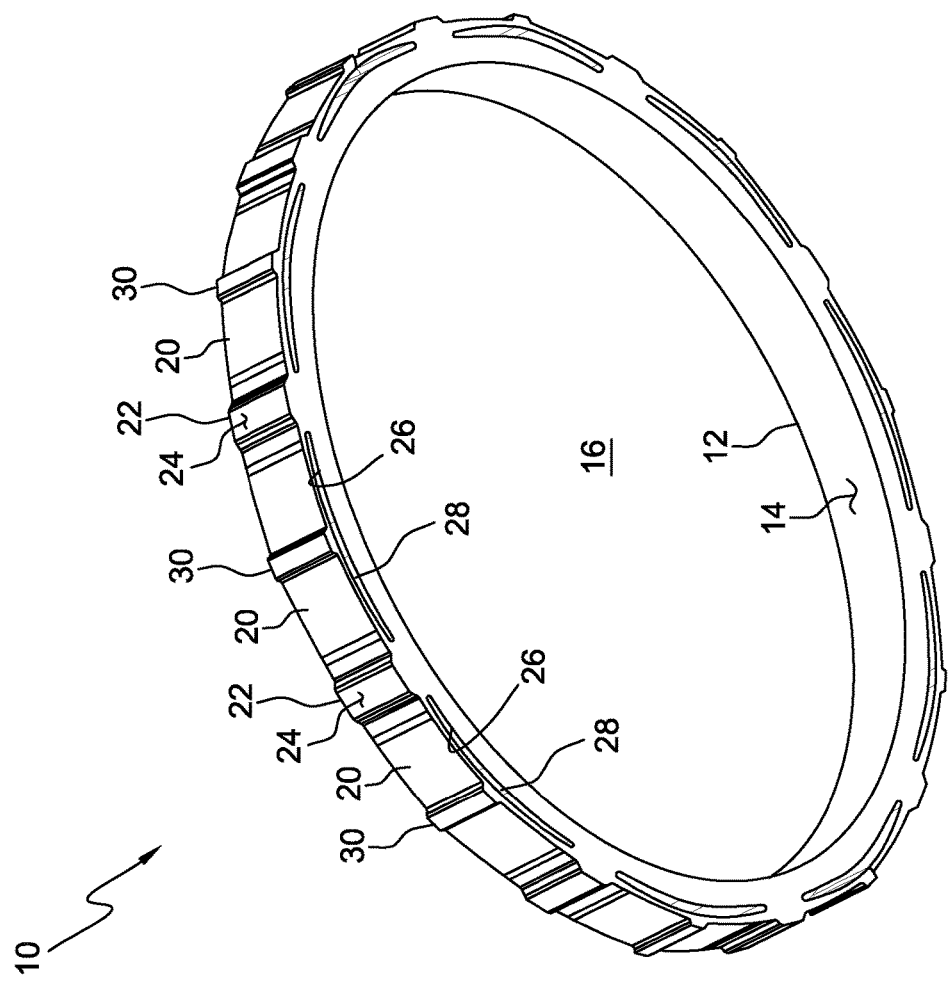
FIG. 1 illustrates a perspective view of an exemplary radial spring according to the present disclosure.
Figure 2:
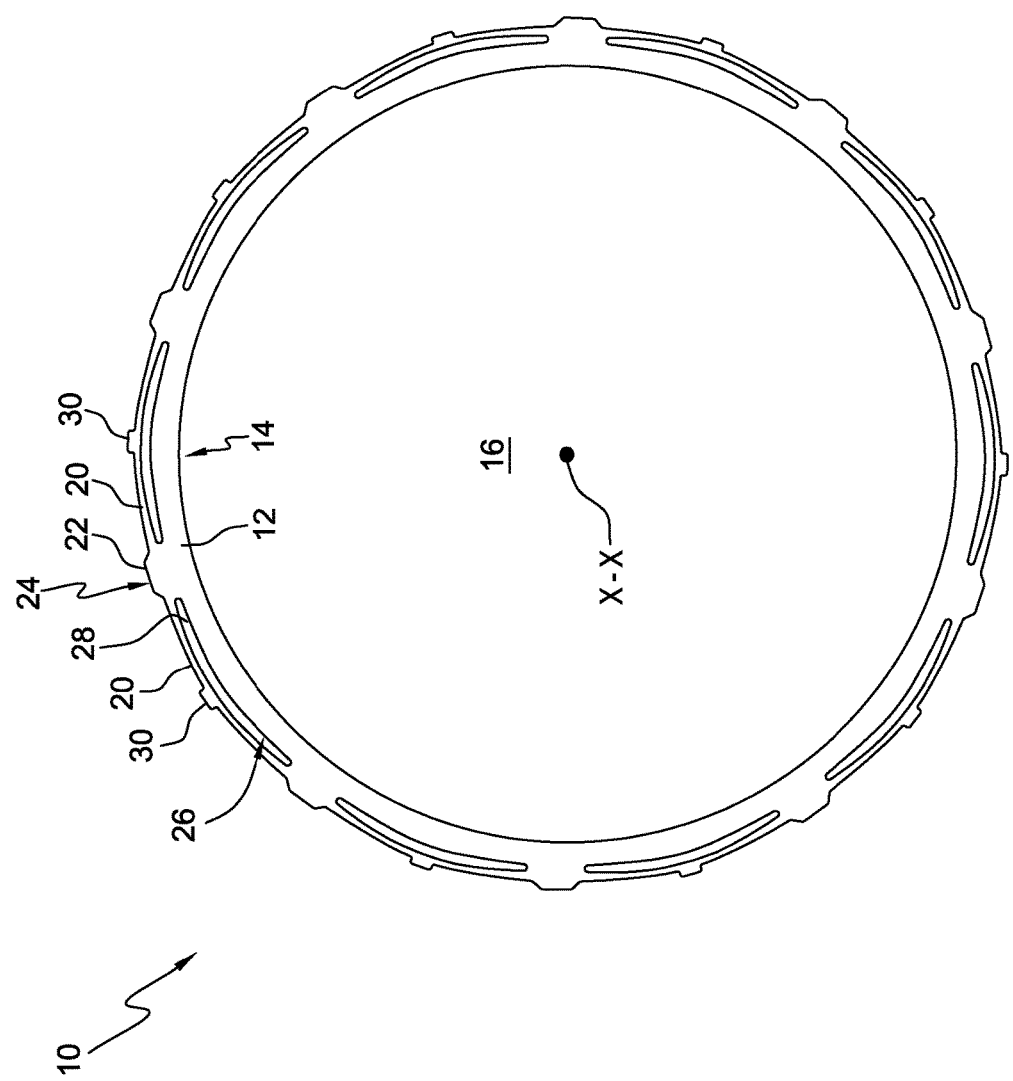
FIG. 2 illustrates a front view of the exemplary radial spring of FIG. 1.

FIGS. 1 and 2 illustrate one exemplary embodiment of a radial spring according to the present disclosure, generally referenced by reference numeral 10, that is configured to control, prevent, limit or otherwise manage forces, such as radial forces. In some embodiments, control of such radial forces between concentric components may ensure proper or intended use of the components. In some embodiments, control of such radial forces between concentric components may prevent damage to the components. The radial spring 10 may be substantially ring-shaped, or include ring-segments that, together, form a substantially ring-shape. However, it is noted that the radial spring 10 may be shaped, sized or otherwise configured to accommodate any concentric or overlapping components (e.g., non-cylindrical concentric components). In some embodiments the radial spring 10 is of one-piece construction. For example, the radial spring 10 may be fabricated as an integral, one-piece component. In some embodiments, the radial spring 10 may be formed from one or more metal. In some embodiments, the radial spring 10 may be formed from plastic. In some embodiments, the radial spring 10 may formed by wire electric discharge machining (EDM) (e.g., from solid round stock), fused deposition, additive manufacturing, molding, stamping, machining or the like.

As shown in FIGS. 1 and 2, the exemplary radial spring 10 includes an exemplary base or ring portion 12 that extends substantially circularly or cylindrically about an axis or center X-X. The base portion or member 12 may extend about the axis X-X such that it forms a substantially complete ring shape, as shown in FIGS. 1 and 2. However, as shown below, the radial spring 10, including the base 12 thereof, may form a plurality of ring segments that, when assembled with each other, form a substantially complete ring shape.

In the embodiment shown in FIGS. 1 and 2, the base portion 12 may include or define an exemplary first engagement, support or mating surface or edge 14. The first engagement surface 14 may be formed or positioned on the inner side of the base 12 in the radial direction. In this way, the first engagement surface 14 of the radial spring may define an internal aperture 16 extending through the radial spring 10 along the axis X-X. However, as shown below, the radial spring 10 may be configured in a reversed orientation such that the first engagement surface 14 is positioned on the outer side of the base 12 in the radial direction. In the exemplary embodiment, the first engagement surface 14 of the base 12 of the radial spring 10 may be configured to support, mate, abut or otherwise engage with an inner concentrically arranged member or component that is positioned within the aperture 16 of the radial spring 10. In some embodiments, as shown in FIG. 1, the first engagement surface 14 may be substantially planar along the axis X-X, and curved radially about the axis X-X. In some embodiments, that first engagement surface 14 of the base may be defined by a radius extending from the axis X-X. In some embodiments, the first engagement surface 14 of the base may be defined by multiple radii. In some embodiments, the first engagement surface 14 may be substantially smooth, and in other alternative embodiments the first engagement surface 14 may include a texture or relatively rough surface finish.

In some embodiments, as shown in FIGS. 1 and 2, the radial spring 10 may include a plurality of individual or distinct resilient members 20. In some embodiments, the resilient members 20 may be provided on an opposing side of the base 12 as compared to the first engagement surface 14 (e.g., in the radial direction). For example, the resilient members 20 may be positioned about the exterior sides or surfaces of the radial spring 10 in the radial direction, as shown in FIGS. 1 and 2. However, as discussed herein, if the first engagement surface 14 is positioned on the exterior of the radial spring 10 in the radial direction, the resilient members 20 may be positioned about the interior of the radial spring 10 in the radial direction (and thereby, potentially, form the internal aperture 16). In some embodiments, the resilient members 20 may be spaced about the axis X-X of the radial spring 10. In some embodiments, the resilient members 20 may exert substantially uniform radial forces to a concentric component adjacent thereto. In some embodiments, the resilient members 20 may be provided uniformly about the radial spring 20 in the radial direction. In some embodiments, the resilient members 20 may be aligned about the axis X-X of the radial spring 10 such that pairs of resilient members 20 substantially oppose each other about the axis X-X.

In some embodiments, the resilient members 20 may be integral with the base portion or segment 12 (i.e., the plurality of resilient members 20 and the base portion 12 may be of one piece-construction). For example, the resilient members 20 may be formed integrally with the base 12. In other embodiments, the resilient members 20 may be distinct components from the base 12 and coupled thereto. In some embodiments, the radial spring 10 may include at least four resilient members 20, or at least six resilient members 20, or at least eight resilient members 20, or at least ten resilient members 20, or at least sixteen resilient members 20, or at least twenty resilient members 20. In some embodiments, the radial spring 10 may include between about 8 to about 24 resilient members 20.

As stated above, the resilient members 20 may be configured to exert radial forces (outwardly or inwardly, depending upon their orientation) in the radial direction to a concentric component adjacent thereto. In some embodiments, at least one support member 22 extends radially away from the base 12 (outwardly or inwardly depending upon the orientation of the radial spring 12) as it extends from the base portion 12. In some embodiments, at least one support member 22 does not extend radially away from the base portion 12 as it extends from the base portion 12. In some embodiments, each support member 22 extends from the base portion 12 at an angle relative to the axis X-X (or relative to the "axial direction" (i.e., a direction extending substantially parallel to the axis X-X) and/or relative to the radial direction). In some embodiments, each support member 22 extends from the base portion 12 at a substantially linear angle relative to the axis X-X. In some other embodiments, each support member 22 extends from the base portion 12 at a substantially arcuate or curved direction relative to the axis X-X (e.g., curved about the axis X-X).

In some embodiments, the resilient members 20 may be substantially resiliently or elastically deformable such that, when deformed inwardly or outwardly in the radial direction, the resilient members 20 exert an opposing radial force. Each resilient member 20 may be configured to exert substantially the same radial force as each other. In some embodiments, the resilient members 20 are spaced about the base 12 (i.e., spaced about the axis X-X) of the radial spring 10, and the radial spring 10 exerts a substantially radially uniform inward or outward radial force (depending upon the orientation of the resilient members 20) to a concentric component (e.g., substantially uniform radial forces about the axis X-X).

As shown in FIG. 2, the exemplary radial spring 10 may include radially extending support members 22 positioned between adjacent resilient members 20 in a direction angled relative to the axis X-X. For example, as shown in FIG. 2, each support member 22 may extend radially from the exterior side or surface 26 of the base 12 and define an exterior (or interior, depending upon the orientation of the spring 10) second support surface 24. The exterior side or surface 26 of the base 12 may substantially oppose the interior side or first engagement surface 14 of the base 12. In the exemplary embodiment of FIGS. 1 and 2, the second engagement surfaces 24 of the support members 22 may be configured to support, mate, abut or otherwise engage with an outer concentrically arranged member or component. In some embodiments, as shown in FIG. 1, the second support surface 24 of each support member 22 may be substantially planar along the axis X-X, and curved about the axis X-X. In some embodiments, the second support surfaces 24 may be defined by a radius extending from the axis X-X. In some embodiments, the second support surfaces 24 may be defined by multiple radii. In some embodiments, the second support or engagement surfaces 24 of the support members 22 may be substantially smooth, and in other alternative embodiments the second support surfaces 24 may include a texture or relatively rough surface finish.

In some embodiments, the radially extending support members 22 and the resilient members 20 (and, potentially, the base portion 12) may be integral. In other embodiments, the radially extending support members 22 may be distinct components that are coupled to separate and distinct support members 22 (and, potentially, a separate and distinct base portion 12).

In some embodiments, the radially extending support members 22 may support, or extend from, a side of the resilient members 20. For example, each resilient member 20 may extend between adjacent support members 22 in a direction angled relative to the axis X-X (e.g., about the axis X-X), as show in FIGS. 1 and 2. In such an embodiment, the support members 22 may take the form of leaf springs. In some embodiments, each resilient member 20 may extend from a medial portion of the radially extending support members 22 in the radial direction, as shown in FIG. 2. In this way, the second engagement surfaces 24 of the support members 22 may be positioned further radially than the corresponding resilient members 20 extending therefrom. As described further below, such an arrangement or orientation is advantageous as the further-radially positioned second engagement surfaces 24 of the support member 22 create a gap or space between the resilient members 20 and an adjacent concentric component or member (i.e., a gap adjacent each support member 22). The gap or space between the resilient members 20 and an adjacent concentric component or member (formed by the support members 22) allows for a device or tool to be inserted between the resilient members 20 and the component to facilitate deformation resilient members 20 and thereby installation and/or removal of the radial spring 10. The second engagement surfaces 24 of the support member 22 may also be effective in limiting the radial deformation or travel of the resilient members 20 during use. For example, when positioned on the exterior of the base member 12 in the radial or lateral direction, the second engagement surfaces 24 may prevent the amount of inward radial deformation of the resilient members 20 because at a predetermined level of deformation the adjacent concentric outer component will bottom out on the second engagement surfaces 24.

As shown in FIG. 2, each resilient member 20 may extend at direction angled relative to the axis X-X and radially between adjacent support members 22. For example, the resilient members 20 may be convex and follow the ring shape of the radial spring. In some embodiments, at least a medial portion of the resilient members 20, in a direction angled relative to the axis X-X, may be spaced in the radial direction from the exterior side or surface 26 (or interior, depending upon the orientation of the radial spring 10) of the base 12, as shown in FIGS. 1 and 2. For example, an interior-facing (or exterior-facing, depending upon orientation) side or surface of each resilient member 20 may be spaced from the exterior side or surface 26 of the base 12. Further, as discussed above, each resilient member 20 may extend from a medial portion of the radially extending support members 22 in the radial direction. The radial spacing of the resilient members 20 from the base 12 in the radial direction may thereby form a gap, aperture or space 28 in the radial direction. The space 28 between each resilient member 20 and the base 12 may allow for each resilient member 20 to deform radially inwardly (or outwardly, depending upon the orientation of the spring 10), such as when seated concentrically within (or about) an outer (or inner) member or component. In this way, the radial spring 10 may be configured such that the resilient members 20 are deflected, biased or deformed (e.g., inwardly or outwardly) when positioned concentrically with another component or member, thereby exerting radial forces substantially uniformly radially outward (or inward, depending on the configuration) against the other component or member. In some embodiments, the resilient members 20 may be deflected, biased or deformed inwardly by a concentrically positioned component. In such an embodiment, the radial spring 10 may be translated axially to a groove in the component. The groove may allow the resilient members 20 to deflect back towards their neural positions, at least to some extent, such that the resilient members 20 are positioned partially in the groove to thereby removably couple or lock the radial spring 10 and the component. In some embodiments, the resilient members 20 may be configured to apply substantially the same amount of force at differing levels or amounts of deflection or deformation.

As also shown in FIGS. 1 and 2, the resilient members 20 may each include or define a third engagement surface or portion 30. The third engagement surface or portion 30 may be the aspect or portion of the resilient members 20 that engage, abut or otherwise interact with an adjacent concentric component. The third engagement surfaces 30 of the resilient members 20 may be extended in the radial direction from the remaining portions or aspects of the resilient members 20. For example, as shown in FIG. 2, the third engagement surfaces 30 may be extended and positioned further outwardly (or inwardly) in the radial direction than the other portions of the resilient members 20. In some such embodiments, the third engagement surfaces 30 of the resilient members 20 may thereby form a gap or space between the remaining portions of the resilient members 20 and an adjacent concentric component when they engage the component. The gap or space between the resilient members 20 and an adjacent concentric component may allow for a device or tool to be inserted between the resilient members 20 and the adjacent component to, ultimately, deflect or deform of the resilient members 20 to facilitate the installation and/or removal of the radial spring 10. Further, the junction between the third engagement surfaces 30 of the resilient members 20 and the adjacent portion of the resilient members 20 may provide a stop or barrier feature that prevents such a tool from over-rotating or translating past the resilient members 20.

In some embodiments, the radial spring 10 may be configured such that the engagement surfaces 30 of the resilient members 20 are positioned further outward or inward (depending upon the orientation of the spring 10) in the radial direction than the other aspects of the radial spring 10, such as the second engagement surfaces 24 of the support members 22, as shown in FIGS. 1 and 2. In this way, the radial spring 10 may be configured such that the engagement surfaces 30 of the resilient members 20 engage an adjacent concentric component and deflect or deform— thereby apply radial forces of the component. Further, the radial spring 10 may be configured such that when coupled or arranged with a concentric adjacent component, the resilient members 20 are only deflected or deformed a portion or fraction of their total potential radial travel. As such, in a coupled state, the radial spring 10 may be configured such that the resilient members 20 apply radial forces to the adjacent concentric component, but allow at least a minimum amount or level of radial movement between the radial spring 10 and the component. In this way, the resilient members 20 may deflect or deform to allow relative radial movement between the radial spring 10 and the adjacent component to thereby control, prevent, limit or otherwise manage radial forces, such as excess radial forces, from damaging or otherwise interfering with the use of the component. As another example, the resilient members 20 may deflect or deform to allow relative radial movement between the radial spring 10 and the component. This feature may dampen shock forces imposed on the radial spring 10 from a concentric component.

Figure 3:
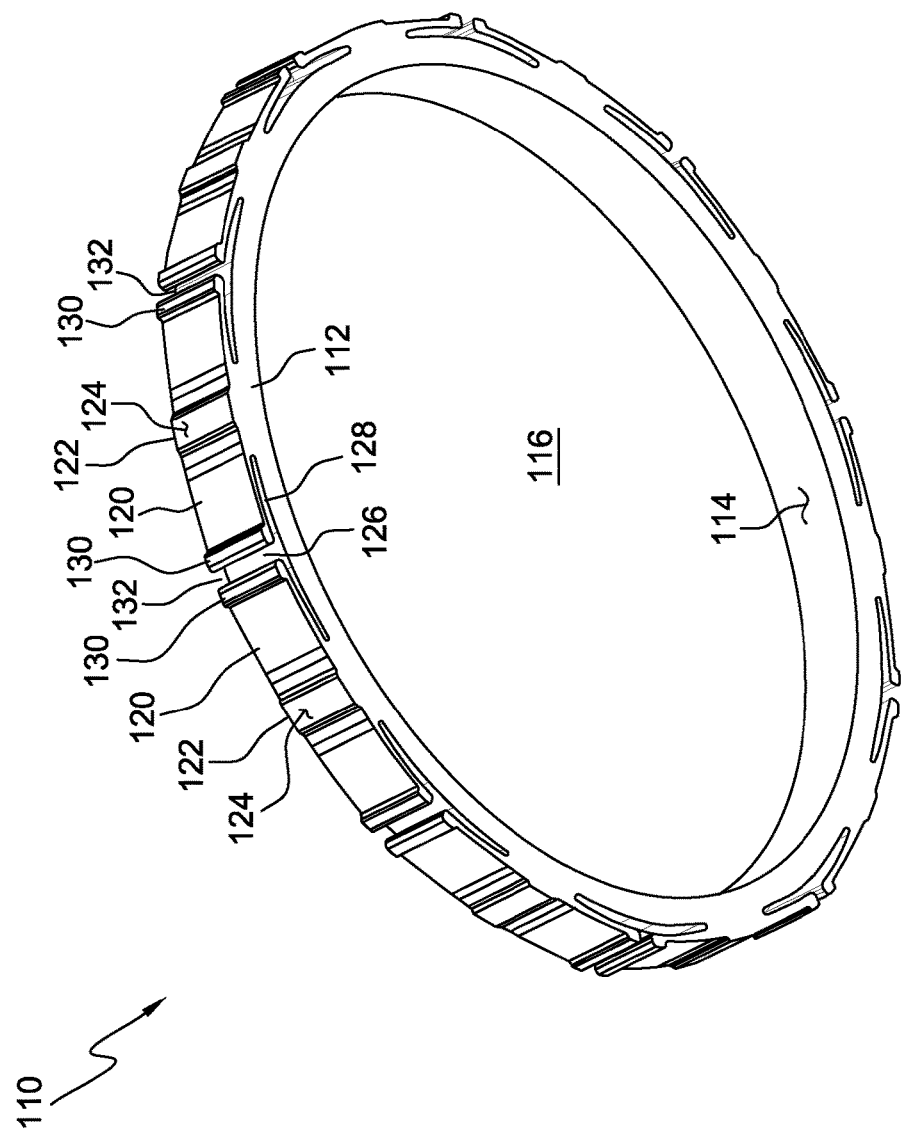
FIG. 3 illustrates a perspective view of another exemplary radial spring according to the present disclosure.
Figure 4:
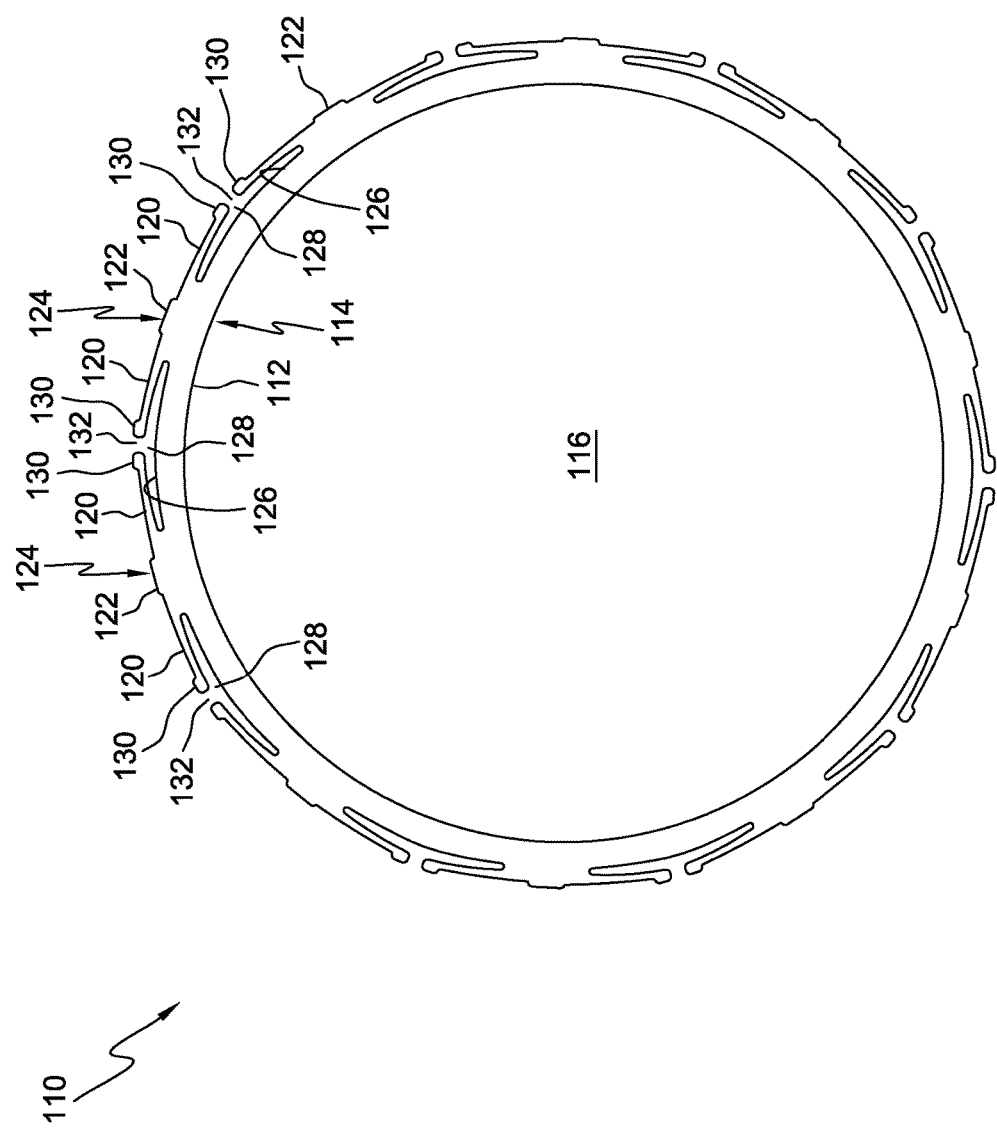
FIG. 4 illustrates a front view of the exemplary radial spring of FIG. 3.

In FIGS. 3 and 4, another exemplary radial spring embodiment of the present invention is indicated generally by the reference numeral 110. The radial spring 110 is substantially similar to the radial spring 10 described above with reference to FIGS. 1 and 2, and therefore like reference numerals preceded by the numeral "1" are used to indicate like elements, functions, aspects or the like. As shown in FIGS. 3 and 4, the radial spring 110 differs from radial spring 10 in the configuration or design of the resilient members 20.

As shown in FIGS. 3 and 4, the resilient members 120 of radial spring 110 are cantilever spring-type members that extend from, or are coupled to, only one support member 122. For example, adjacent support members 122, 122 may each include a separate and distinct resilient member 120 extending therefrom radially toward each other, as shown in FIGS. 3 and 4. In such an embodiment, the pairs of resilient members 120, 120 extending toward each other from adjacent support members 122, 122 may not touch or abut one another, but rather form a gap or space 132 therebetween in the radial direction, as shown in FIGS. 3 and 4. As shown in FIGS. 3 and 4, the radial tips or ends of the support members 122 may include or define the third engagement member or surface 230 of the radial spring 110. In some embodiments, each support member 122 includes a pair of resilient members 120, 120 extending therefrom in differing or opposing radial directions, as shown FIGS. 3 and 4.

Figure 5:
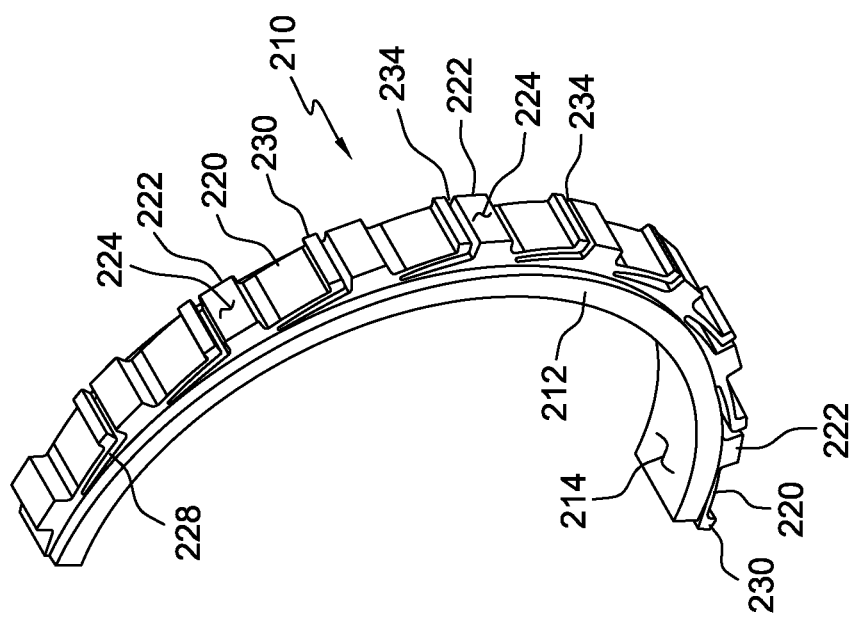
FIG. 5 illustrates a perspective view of another exemplary radial spring according to the present disclosure.

In FIG. 5, another exemplary radial spring embodiment of the present invention is indicated generally by the reference numeral 210. The radial spring 210 is substantially similar to the radial springs 10 and 110 described above with reference to FIGS. 1-4, and therefore like reference numerals preceded by the numeral "2" are used to indicate like elements, functions, aspects or the like. As shown in FIG. 5, the radial spring 210 differs from radial springs 10 and 110 in the configuration or design of the resilient members 220.

As shown in FIG. 5, the resilient members 220 of radial spring 210 are cantilever spring-type members that extend from only one support member 222. Further, as shown in FIG. 5, each support member 222 may include a singular resilient member 220 extending therefrom in a radial direction and a direction angled relative to the axis X-X. In some such embodiments, each resilient member 220 may extend in the same direction angled relative to the axis X-X as each other, as shown in FIG. 5. In some embodiments, as shown in FIG. 5, each resilient member 220 may extend from a respective support member 222 along a direction angled relative to the axis X-X toward an adjacent support member 222. In some such embodiments, the resilient members 120 may not touch or abut the adjacent support member 222, but may form a gap or space 234 in the radial direction between the radial end of the resilient member 220 and the adjacent support member 222, as shown in FIG. 5.

As also shown in FIG. 5, the radial spring 210 differs from radial springs 10 and 110 in that radial spring 210 includes or defines a plurality or ring segments or portions that, when coupled, form a substantially ring-shape. In the exemplary embodiment of FIG. 5, the radial spring 210 includes two segments. In other embodiments, the radial spring 210 may include more than two segments. The segments of the radial spring 210 may be coupled to each other before or after installation of the segments with an adjacent concentric component (inwardly or outwardly adjacent to the radial spring 10). In some embodiments, the segments of the radial spring 210 may be welded, glued, bonded, or otherwise substantially coupled to one another. In some other embodiments, the segments of the radial spring 210 may not be coupled to each other, rather arranged or temporarily held in place by the one or more adjacent concentric components with which the radial spring 210 is installed. In some embodiments, the ring segments may be positioned within a groove of the adjacent concentric component.

Figure 6:
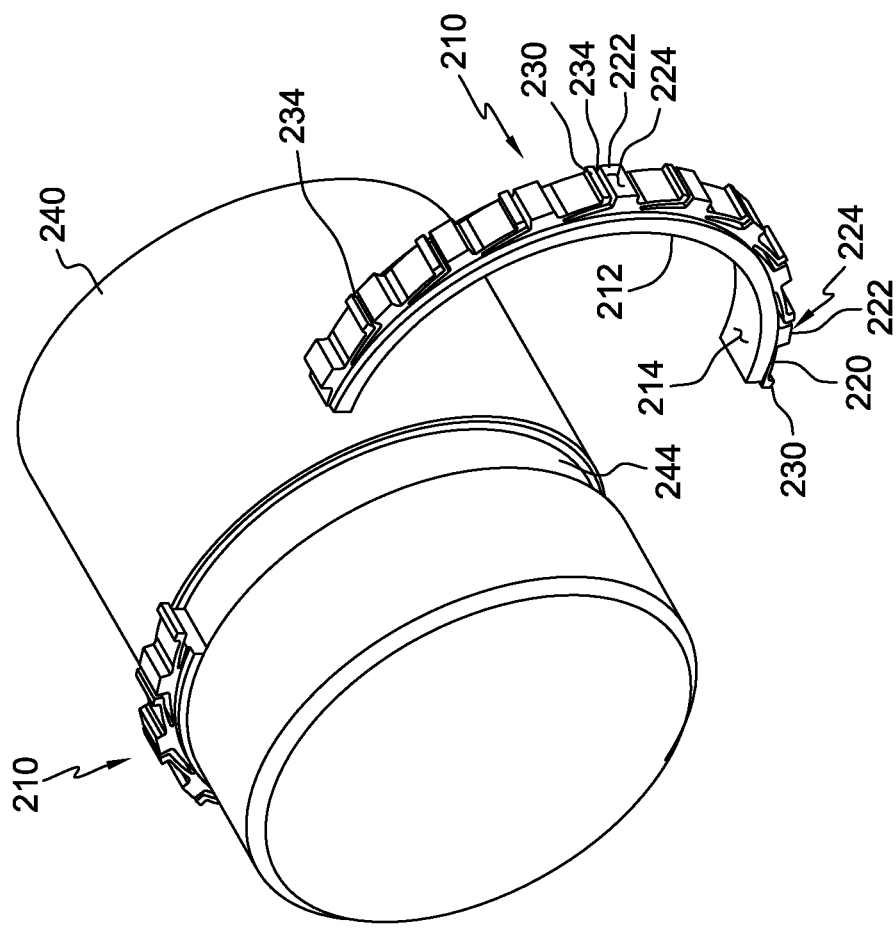
FIGS. 6-11 illustrate exemplary methods of installing the exemplary radial spring of FIG. 5 between adjacent concentric components.

FIGS. 6-11 illustrate an exemplary installation method of the radial spring 210 of FIG. 5 between two concentric components. It is noted that although the installation method is shown with a radial spring 210 that includes resilient members 220 positioned on the exterior of the spring 210 in the radial direction, the installation method equally applies to radial springs 210 with resilient members 220 positioned on the interior side of the springs 210 in the radial direction. In some embodiments, as shown in FIGS. 6-11, the two concentric components may include a first inner cylindrical component 240 and a second outer cylindrical component 242. In some embodiments, at least one of the inner cylindrical component 240 and outer cylindrical component 242 may be at least part of a bearing, such as an inner or outer race, respectively, of a bearing. As shown in FIG. 6, the inner cylindrical component 240 may include a groove 244 sized and shaped to accept the radial spring 210. As also shown in FIG. 6, the segments of the radial spring 210 may be positioned within the groove 244 of the inner cylindrical component 240 such that the first engagement surface 214 of the base 212 of the radial spring 210 engages or abuts the outer surface of the groove 244 of the inner cylindrical component 240.

Figure 7:
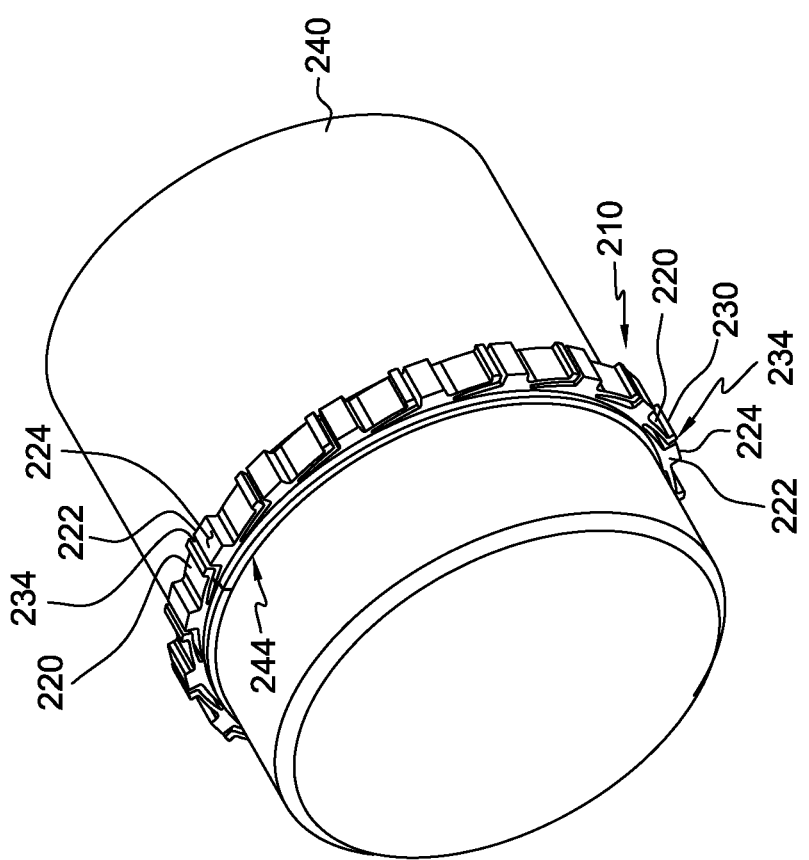
Figure 8:
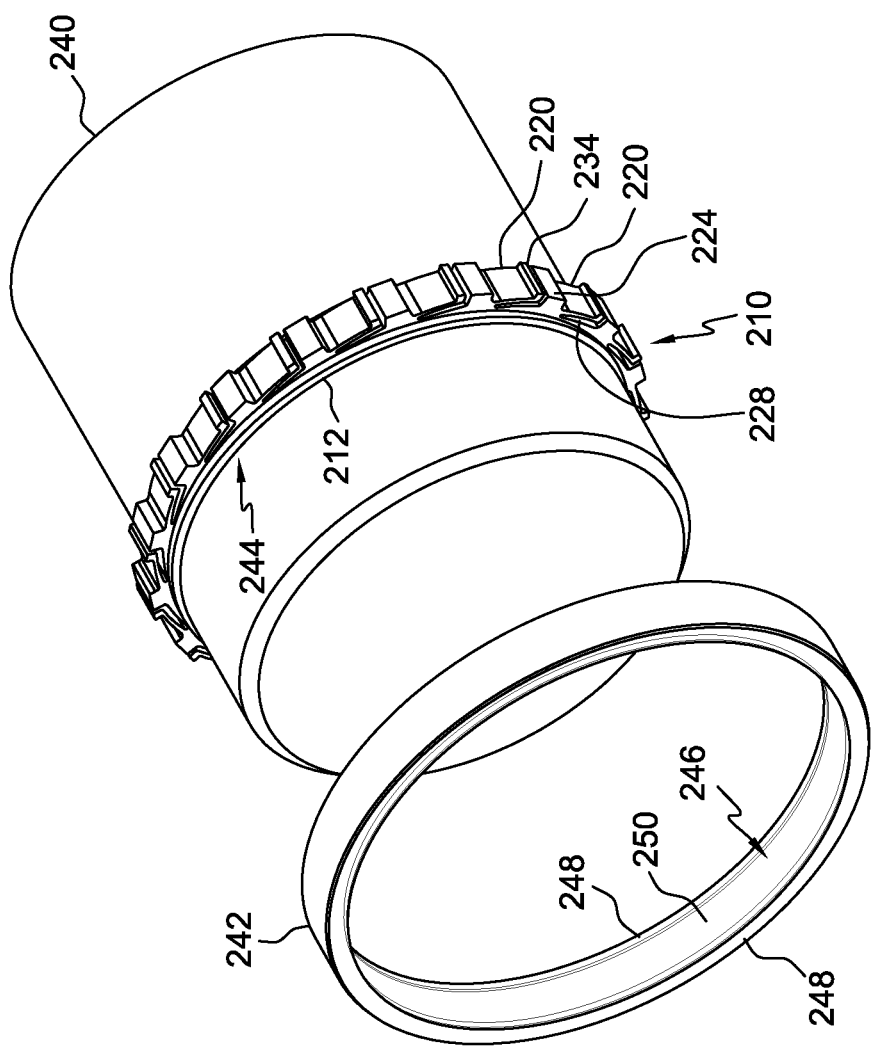

Each segment of the radial spring 210 may be installed within the groove 244 of the inner cylindrical component 140 until the radial spring 210 encircles or surrounds the groove 244, and thereby the inner cylindrical component 140, as shown in FIG. 7. In some embodiments, once installed onto the first inner component 240, the segments of the radial spring 210 may be welded or otherwise fixed or coupled to one another. In some embodiments, once installed onto the first inner component 240, a second outer component 242 may be translated over the first inner component 240 such that the first and second components 240, 242 are concentric, as shown in FIG. 8. As also shown in FIG. 8, the outer component 242 may include a channel or groove 246 provided on the inner side of the outer component 242 in the radial direction. The channel 246 may extend circumferentially about the outer component 242 for receiving at least a portion of the radial spring 210 therein. In some embodiments, as shown in FIG. 8, the channel 246 includes radially extending side walls 248 and a bottom surface 250 extending axially or longitudinally between the side walls 248. In some embodiments, the bottom surface 248 is extended or positioned further radially outward (or inward) than the inner surfaces of the side wall 248. In some embodiments, the channel 246 is sized and shaped to accept at least a portion of the radial spring 210 therein.

Figure 9:
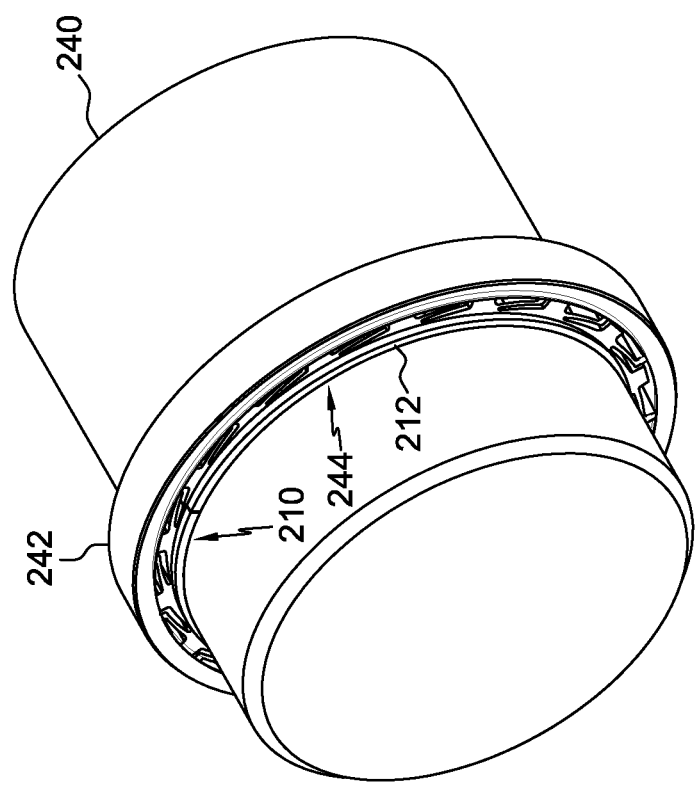

As shown in FIG. 9, the second outer component 242 may be translated over the first inner component 240 and the radial spring 210 (positioned within the groove 244 of the first inner component 240) such that the first and second components 240, 242 and radial spring 210 are concentric and the radial spring 210 is positioned between the first and second components 240, 242 in the radial direction.

Figure 10:
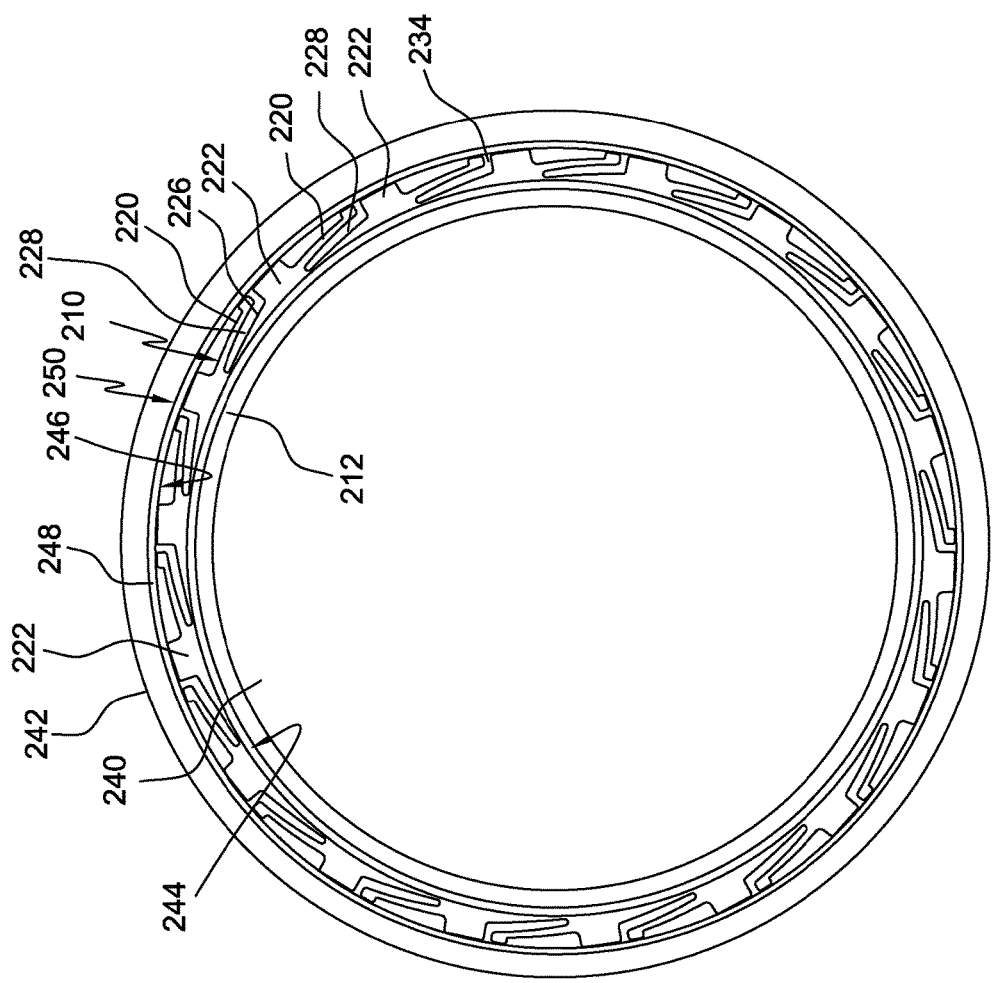
Figure 11:
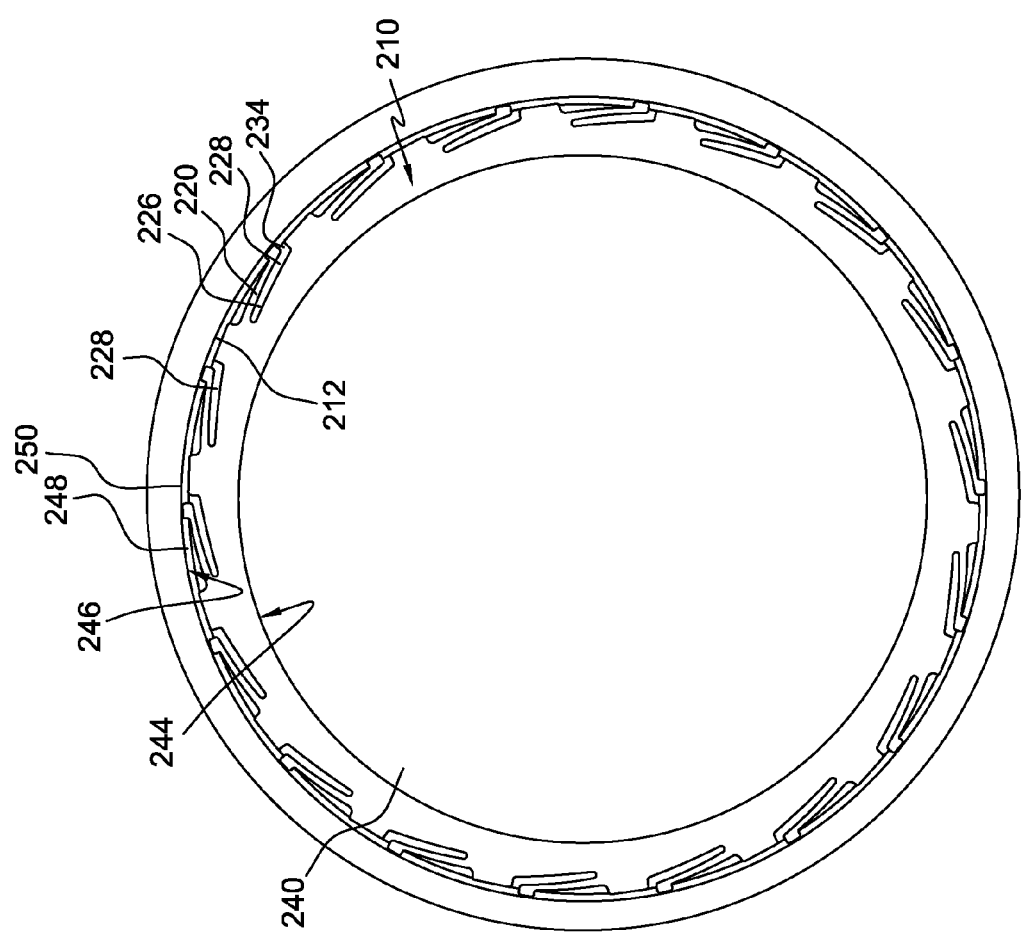

The cross-sectional views of FIGS. 10 and 11 illustrate the method of seating the radial spring 210 in the channel 246 of the outer second component 242. In some embodiments, the second outer component 242 and the radial spring 210 (and thereby the first inner component 240) may be translated axially or longitudinally with respect to each other to seat the radial spring 210 within the channel 246 of the second outer component 242. As shown in FIG. 10, the radial spring 210 may be configured such that a side wall 248 of the channel 246 of the second outer component 242 is capable of radially outwardly deflecting the resilient members 220 of the radial spring 210. In some such embodiments, the third engagement surfaces 230 may engage the inward-facing surface of the side wall 248 of the groove 246 and deflect the resilient members 220 radially inward.

As also shown in FIG. 10, the radial spring 210 may be configured such that the second engagement surfaces 224 of the support members 222 of the radial spring 210 do not engage the inward-facing edge or surface of the side walls 248 of the channel 246. In this way, in a deflected state, the radial spring 210 and the second outer component 242 are capable of being translated axially with respect to one another such that the radial spring 210 is positioned within the channel 246 of the second outer component 242, as shown in FIG. 11. As the bottom surface 250 of the channel 246 of the second outer component 242 is positioned further radially outward than the inward-facing edge or surface of the side walls 248, the resilient members 220 may deflect radially outward back towards their neutral position when positioned in the channel 246. In some embodiments, the third engagements 230 surfaces of the resilient members 220 may engage the bottom surface 250 of the channel 246, as shown in FIG. 11. In such an embodiment, the first engagement surface 214 of the radial spring 210 abuts or engages the groove 244 of the first inner component 240, and the third engagement surfaces 230 of the resilient members 220 abuts or engages the bottom surface 250 of the channel 246 of the second outer component 242. In this way, the radial spring 210 is able to control radial forces between the first inner 240 and second outer 242 concentric components.

Figure 12:
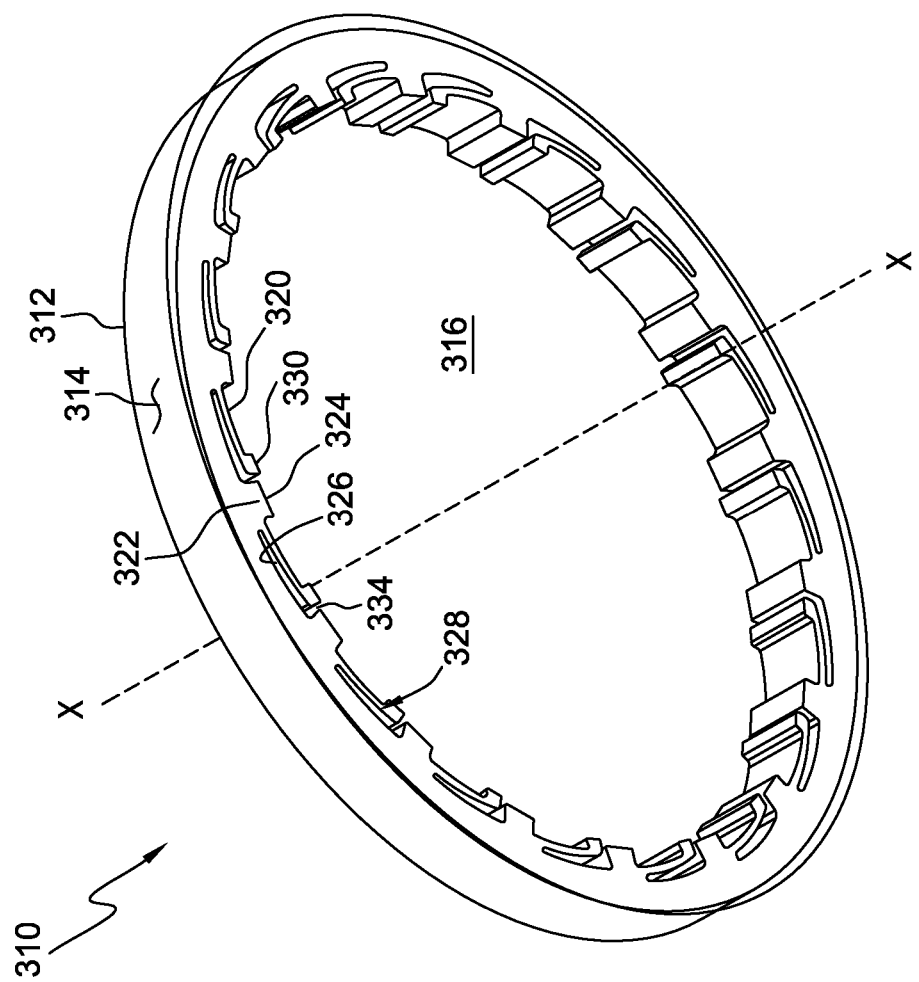
FIG. 12 illustrates a perspective view of another exemplary radial spring according to the present disclosure.

In FIG. 12, another exemplary radial spring embodiment of the present invention is indicated generally by the reference numeral 310. The radial spring 310 is substantially similar to the radial springs 10, 110 and 210 described above with reference to FIGS. 1-11, and therefore like reference numerals preceded by the numeral "3" are used to indicate like elements, functions, aspects or the like. As shown in FIG. 12, the radial spring 310 is substantially similar to the radial spring 210 of FIG. 5, but differs with respect to the orientation or arrangement of the radial spring 310.

As shown in FIG. 12, the exemplary radial spring 310 includes the support members 322 and resilient members 320 formed on the inward-facing or interior side, in the radial direction, of the base 312. As also shown in FIG. 12, the exemplary radial spring 310 includes the first engagement surfaces 314 of the base 314 formed on the outward-facing or exterior side of the base 312.

Figure 13:
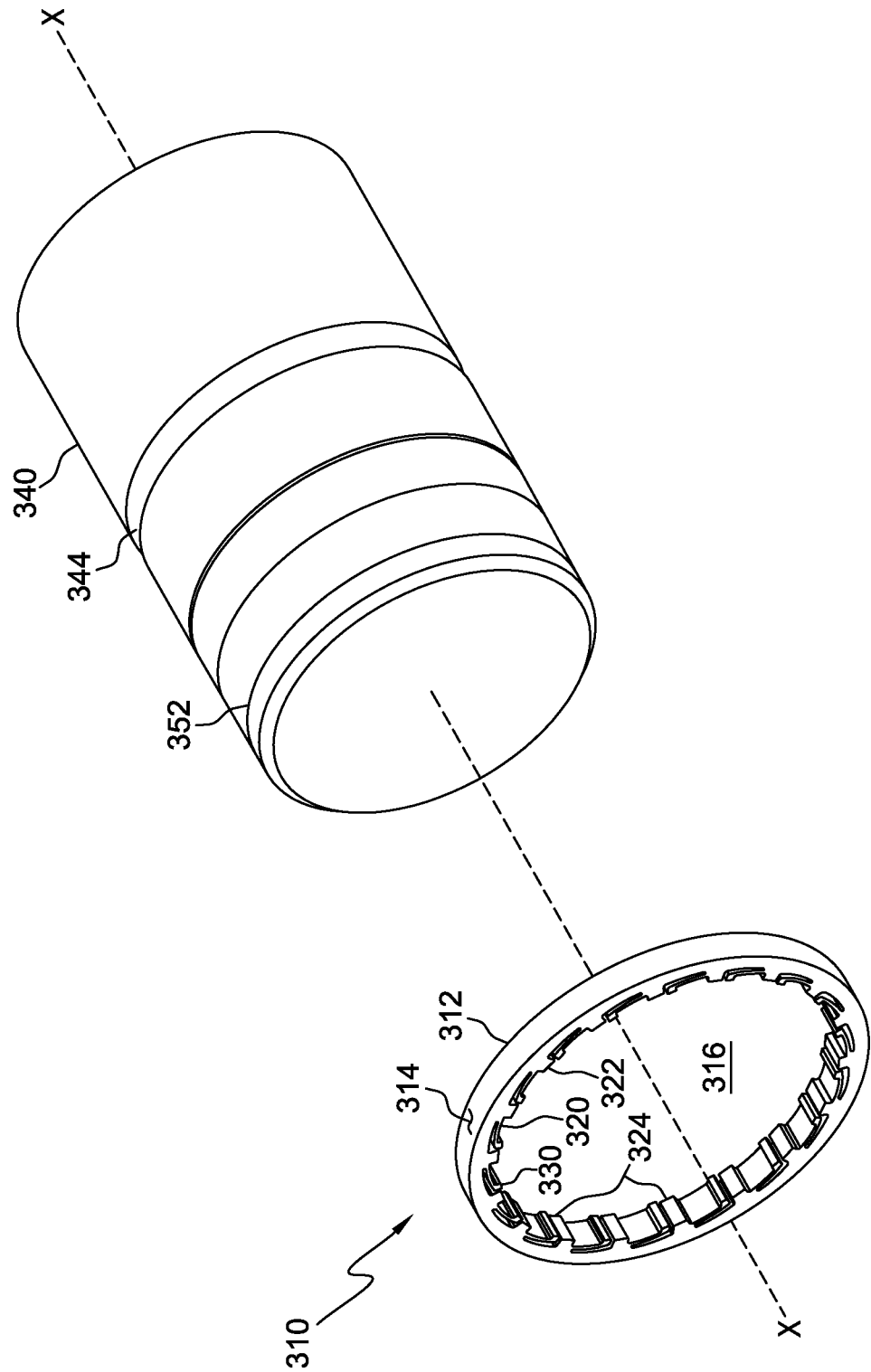
FIGS. 13-20 illustrate exemplary methods of installing and uninstalling the exemplary radial spring of FIG. 12 between adjacent concentric components.
Figure 14:
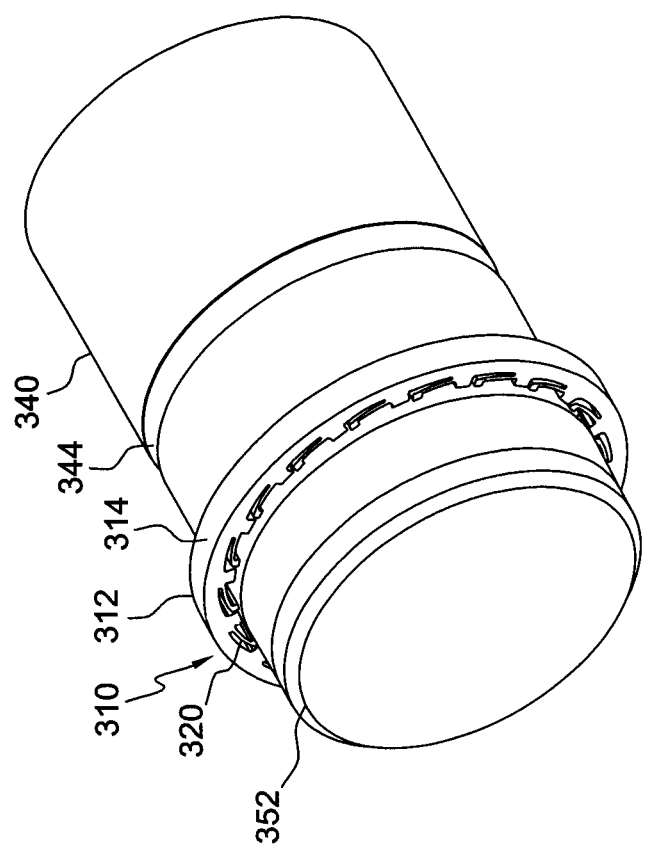
Figure 15:
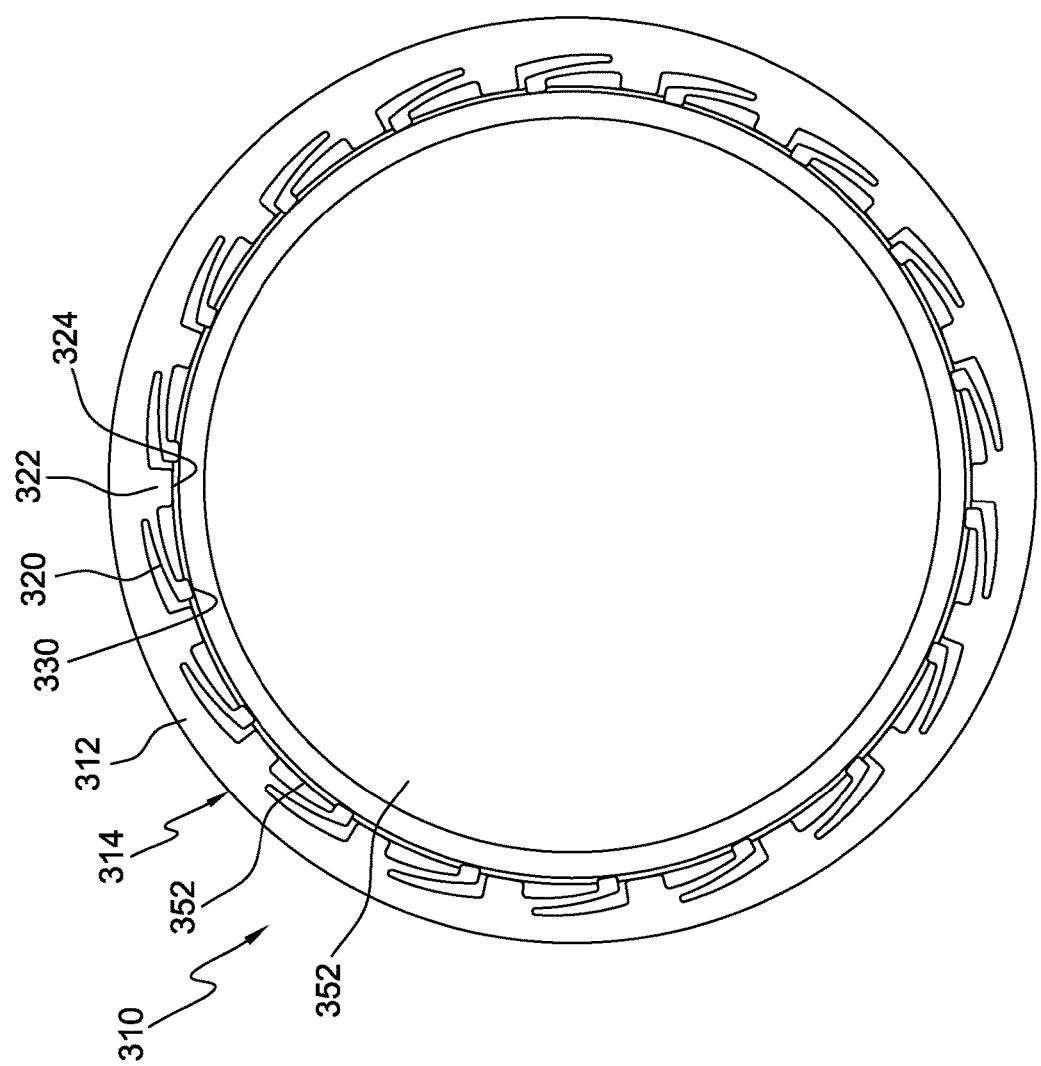

FIGS. 13-20 illustrate exemplary methods of installing and uninstalling the exemplary radial spring 310 of FIG. 12 on a first inner concentric component 340. The methods of FIGS. 13-20 are similar to the installation methods of FIGS. 6-11 with the radial spring 210 of FIG. 5, and therefore like reference numerals preceded by the numeral "3" are used to indicate like elements, functions, aspects or the like. As shown in FIGS. 13-15, installing the exemplary radial spring 310 may include utilizing a deforming device or tool 352. The deforming device 352 may be positioned against an axial end of the first inner concentric component 340, as shown in FIG. 13. The deforming device 352 may include or define an exterior surface that graduates or expands in size such that a free axial end of the deforming device 352 is smaller than an opposing axial end that is abuts the first inner concentric component 340, as shown in FIG. 13. The exterior surface of the deforming device 352 may be conical in shape. The size and shape of the deforming device 352 at the axial end abutting the first inner concentric component 340 may substantially match that of the first inner concentric component 340, as shown in FIG. 5. In some embodiments, the deforming device 352 may be a separate and distinct component from the first inner concentric component 340. In some embodiments, the axial ends of the first inner concentric component 340 and the deforming device 352 may be abutted during the installation process of the radial spring 310. In some embodiments, the first inner concentric component 340 and the deforming device 352 may be releasable coupled to each other during the installation process of the radial spring 310.

As shown in FIGS. 14 and 15, the radial spring 310 may be translated axially and positioned concentrically on the deforming device 352. The radial spring 310 may be further axially translated along the exterior of the deforming device 352 in an axial direction towards the first inner concentric component 340. In such an embodiment, as shown in FIG. 15, the third engagement surfaces 330 of the resilient members 320 may engage the exterior surface of the deforming device 352 and, as the deforming device 352 graduates in size (e.g., diameter), the resilient members 320 may be further deflected radially outward. As also shown in FIG. 15, the second engagement surfaces 324 of the support members 322 may be configured such that they do not abut or interfere with the exterior surface of the deforming device 352 as the radial spring 310 translates axially. In this way, the second engagement surfaces 324 do not impede the deforming device 352 from radially outwardly deflecting the resilient members 320 as the radial spring 310 translates axially along the deforming device 352.

Figure 16:
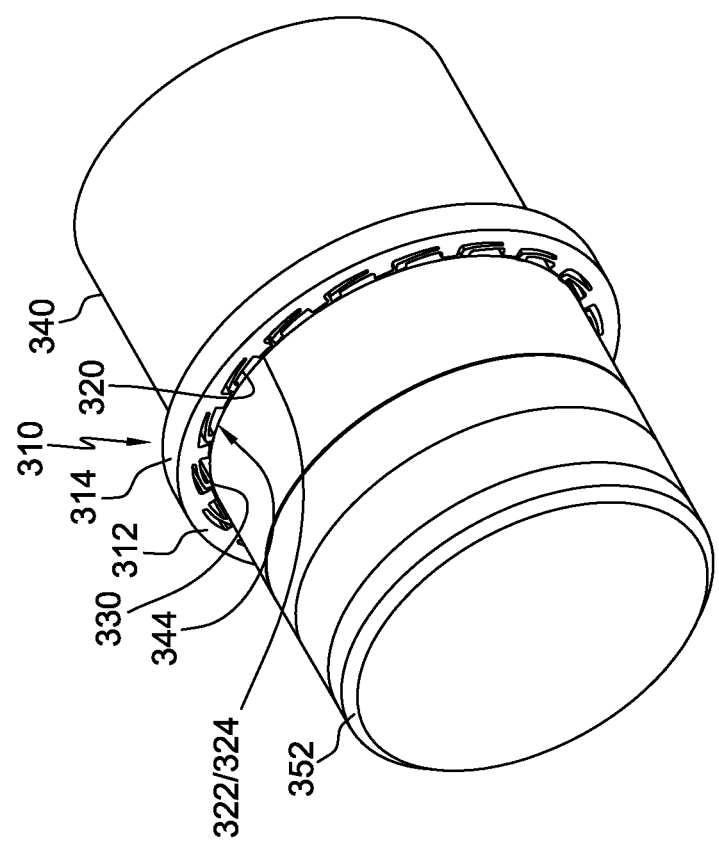

As described above, in some embodiments the size and shape of the deforming device 352 at the axial end abutting the first inner concentric component 340 may be substantially similar to that of the first inner concentric component 340, as shown in FIG. 16. In some such embodiments, as shown in FIG. 16, the radial spring 310 may be translated axially along the exterior surface of the deforming device 352 (gradually deforming the resilient members 320 radially outwardly) and, eventually, over the joint between the axial ends of the deforming device 352 and the first inner concentric component 340 and onto the first inner concentric component 340.

Once positioned on the exterior surface of the first inner concentric component 340, the radial spring 310 may be translated axially, and ultimately positioned within a groove 344 of the first inner concentric component 340. In such an embodiment, the resilient members 320 and support members 322 may be positioned, at least partially, within the groove 344, as shown in FIG. 16. As explained above with respect to the radial spring 310 and the channel 346 of the second outer concentric component 342, the third engagement surfaces 330 of the resilient members 320 may engage and exert a force against the exterior surface of the groove 344. Further, the second support surfaces 324 may be spaced radially away from the exterior surface of the groove 344. In such a way, the radial spring 310 may be coupled to the first inner concentric component 340 via the groove 344, and a second outer concentric component may be positioned about the first support surface 314 of the base 312 of the radial spring 312. In such an embodiment, the first inner component 340 and the second outer component 342 are concentric with each other and the radial spring 310 controls the forces exerted between the first and second components 340, 342 (via the resilient members 320).

Figure 17:
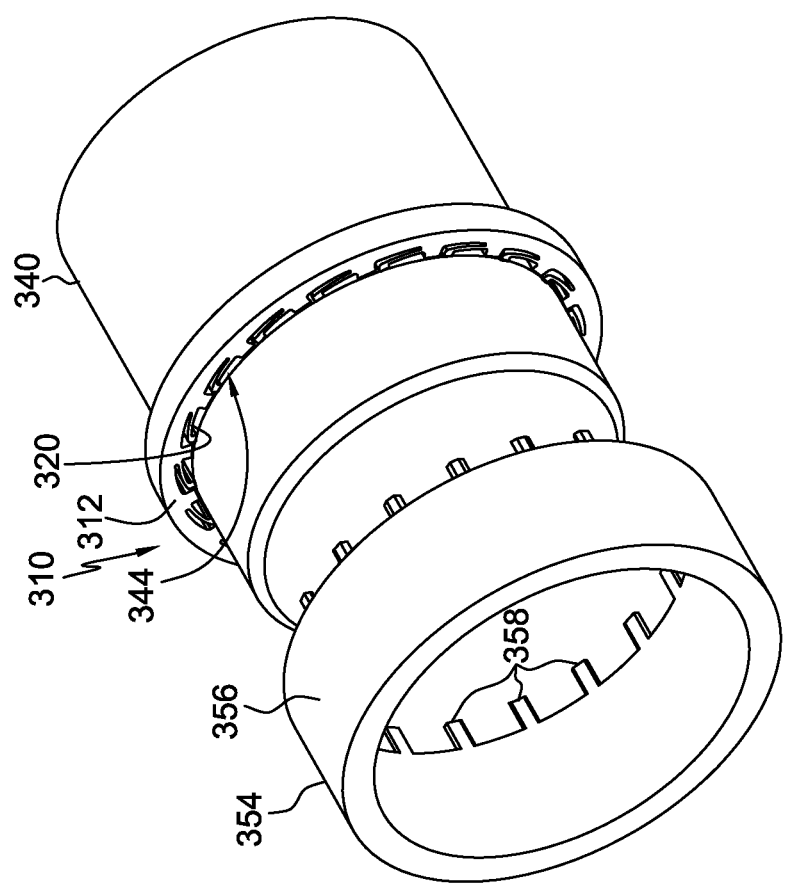

FIGS. 17-20 show exemplary methods of uninstalling a radial spring according to the present disclosure from a component. For example, as shown in FIG. 17, the exemplary radial spring 312 of FIGS. 12-16 may be removed or uninstalled from the groove 344 of the first inner concentric component 340 of FIGS. 13-16. As shown in FIG. 17, a second deforming device or tool 354 may be utilized to remove or uninstall the radial spring 312 from the groove 344 of the first inner concentric component 340.

As shown in FIGS. 17-20, the second deforming device 354 may include a ring portion 356 and a plurality of axially extending members or fingers 358 extending from an axial end of the ring portion 356. The axially extending members 358 may be spaced about the circumference of the ring portion 356, as shown in FIG. 17. As also shown in FIG. 17, the second deforming device 354 may be sized, shaped and otherwise configured to be adjacent and concentric to the exterior surface of the inner concentric component 340. As such, in some embodiments the second deforming device 354 may be configured to be translated axially over an axial end of the inner concentric component 340. In some embodiments, the radial thickness of the second deforming device 354 may be less than or about equal to that of the radial spring 310. In such an embodiment, the second deforming device 354 may be able to be inserted between the inner concentric component 340 and a second outer concentric component abutting the first engagement surface 314 of the base 312 of the radial spring 310.

Figure 18:
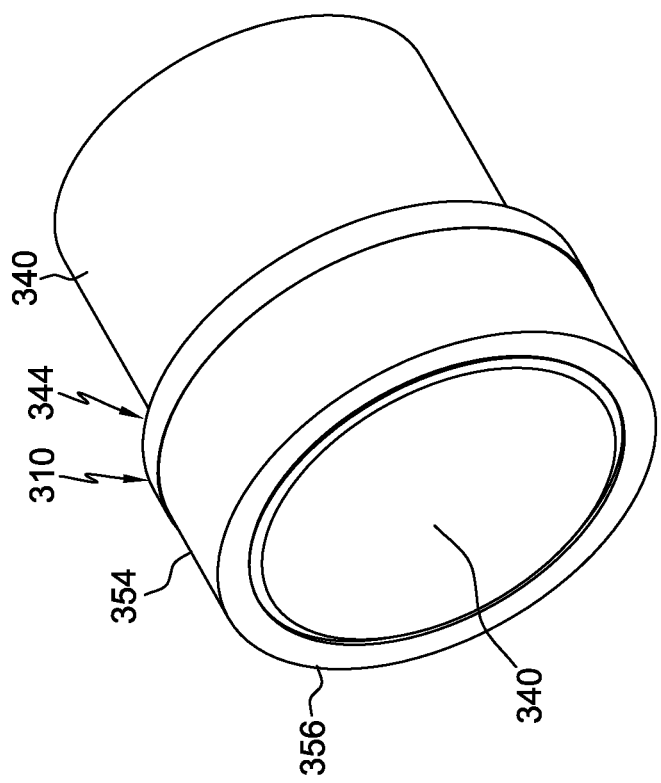
Figure 19:
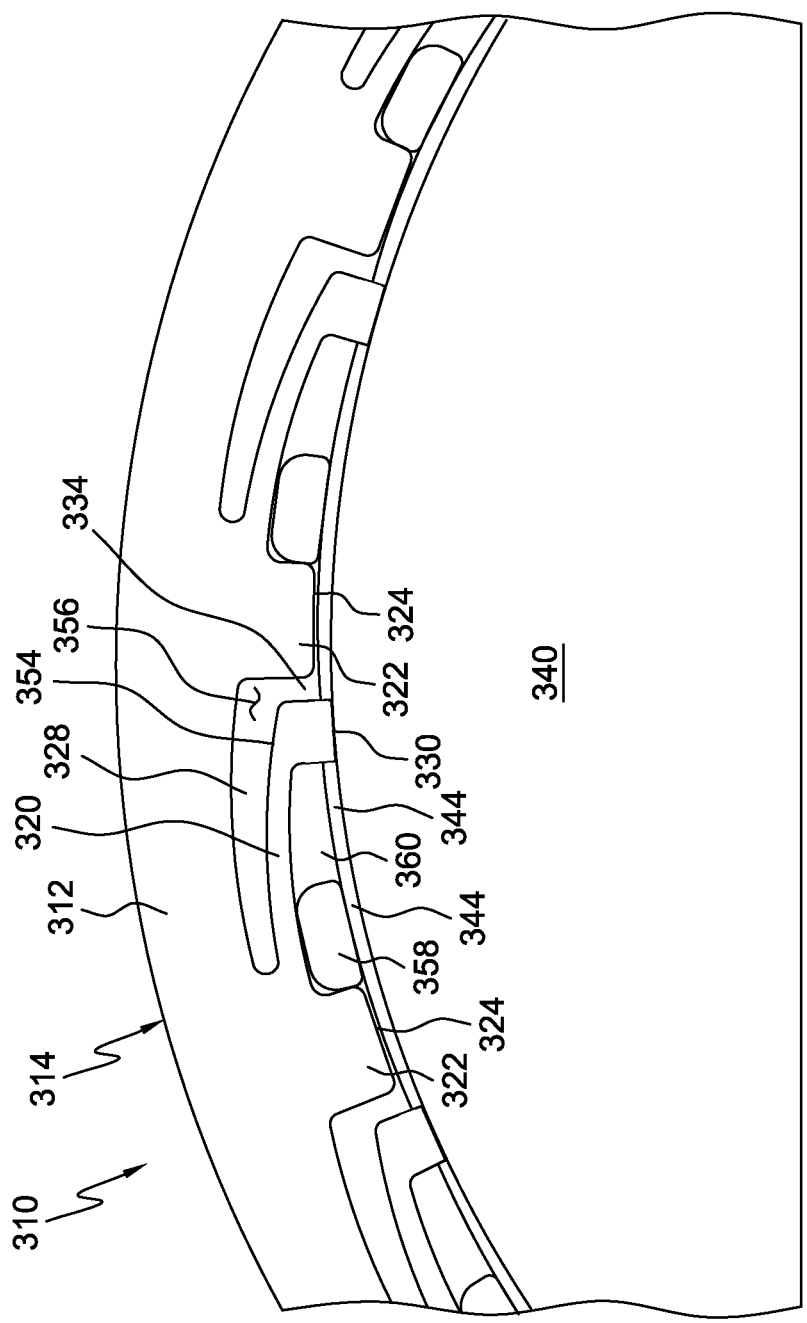
Figure 20:
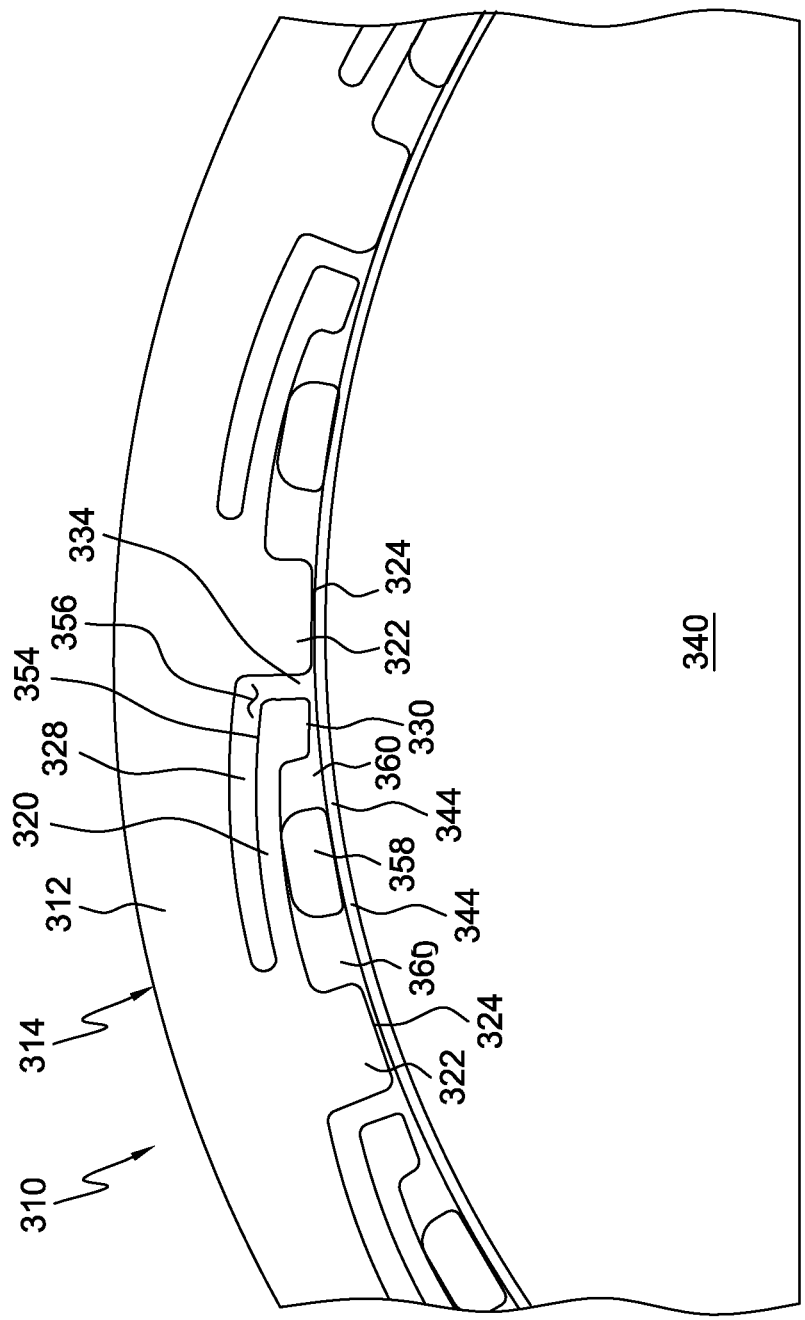

As shown in FIG. 18, the second deforming device 354 may be axially translated over the inner concentric component 340 with the axially extending members 358 proximate the radial spring 310. As shown in FIGS. 18-20, in some embodiments the inner or inward-facing surface of the ring portion 356 of the second deforming device 354 may substantially abut the exterior surface of the first engagement surface 314. Further, in some embodiments the inner or inward-facing surfaces of the axially extending members 358 may abut the exterior surface of the first engagement surface 314, as shown in FIGS. 18-20. As shown in FIG. 18, the second deforming device 354 may be axially translated over the inner concentric component 340 such that the second deforming device 354 engages the radial spring 310 positioned in the groove 344 of the inner concentric component 340.

With reference to the cross-sectional views of FIGS. 19 and 20, the second deforming device 354 may be oriented, and the axially extending members 358 may be configured, such that the axially extending members 358 are positioned in the gap or space 360 between the exterior surface of the groove 344 of the inner concentric component 340 and the interior surface of the resilient members 320. In some embodiments, at least initially, the axially extending members 358 may be translated into the gap 360 between the groove 344 and the resilient members 320 proximate the radially extending support members 322. As described above, the resilient members 320 may extend radially from a medial portion in the radial direction of the support members 322, thereby forming the gap 360 between resilient members 320 and an adjacent concentric component proximate the support members 322 (such as with the exterior surface of the groove 344 of the inner concentric component 340). Further, as the resilient members 320 extend radially inwardly (or outwardly, depending upon the orientation of the radial spring 312) as they extend in a direction angled relative to the axis X-X, the gap 360 between the resilient members 320 and an adjacent concentric component is largest proximate the support members 322.

As shown in FIG. 20, with the axially extending members 358 positioned in the gap 360 between the exterior surface of the groove 344 and the resilient members 320, the ring portion 356 of the second deforming device 354 may be rotated (e.g., manually or mechanically) about the axis X-X, as shown in FIG. 20. As the resilient members 320 extend radially inward as they extend from the support members 322, as shown in FIG. 19, angular rotation of the second deforming device 354 causes the axially extending members 358 to deflect the resilient members 320 radially outward, as shown in FIG. 20. The resilient members 320 may be deformed radially outward via the axially extending members 358 until the axially extending members 358 engage or abut the radially extending third engagement member 330. In this way, the second deforming device 354 may radially outwardly deflect the resilient members 320 a sufficient degree such that the third engagement members 330 of the radial spring 310 are removed from within the groove 344 of the inner concentric component 340. When the third engagement members 330 of the radial spring 310 are removed from within the groove 344 of the inner concentric component 340, the radial spring 310 and the second deforming device 354 may be axially translated along the inner concentric component 340 and, ultimately, off an axial end of the inner concentric component 340 to uninstall or remove the radial spring 310 from the inner concentric component 340.

As one of skill in the art would recognize, while the second deforming device 354 was described with reference to uninstalling a radial spring, the second deforming device 354 and associated method or process equally applies to installing a radial spring. Further, although the second deforming device 354 was described with reference to uninstalling a radial spring with interior positioned resilient members, the second deforming device 354 and associated method or process equally applies to uninstalling/installing a radial spring with exterior positioned resilient members.

Figure 21:
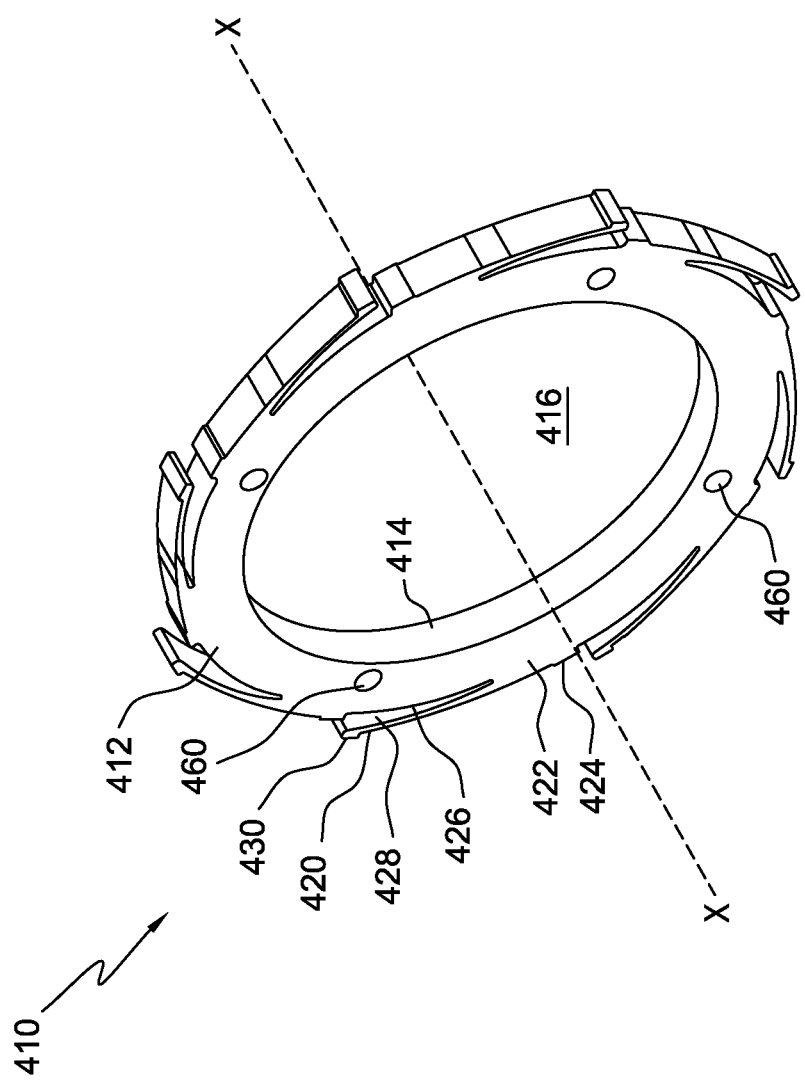
FIG. 21 illustrates a perspective view of another exemplary radial spring according to the present disclosure.

In FIG. 21, another exemplary radial spring embodiment of the present invention is indicated generally by the reference numeral 410. The radial spring 410 is substantially similar to the radial springs 10, 110, 210 and 310 described above with reference to FIGS. 1-20, and therefore like reference numerals preceded by the numeral "4" are used to indicate like elements, functions, aspects or the like. As shown in FIG. 21, the radial spring 410 differs from the radial springs 10, 110, 210 and 310 described above with respect to a plurality of apertures 460 extending axially or longitudinally at least partially through the base 412. The apertures 460 may be spaced about the radial spring 410 about the axis X-X. As explained further below, the axially-extending apertures 460 of the base portion 412 may mate with a deforming device used to deflect the resilient members 420 to facilitate installation and/or removal of the radial spring 410 from one or more adjacent concentric component.

FIGS. 22-27 illustrate exemplary methods of installing and/or uninstalling the exemplary radial spring 410 of FIG. 21 within a second outer concentric component (not shown). However, the exemplary methods of installing and/or uninstalling a radial spring shown in FIGS. 22-27 may equally apply with a radial spring that includes inner or inward-facing resilient members, and therefore to installing and/or uninstalling a radial spring about a first inner concentric component. The methods of FIGS. 22-27 are similar to the installation methods of FIGS. 13-20 with the radial spring 310 of FIG. 12, and therefore like reference numerals preceded by the numeral "4" are used to indicate like elements, functions, aspects or the like. For example, the third deforming device 462 shown in FIGS. 22-27 is similar to the second deforming device 354 shown in FIGS. 13-20, and therefore like reference numerals preceded by the numeral "4" are used to indicate like elements, functions, aspects or the like.

Figure 22:
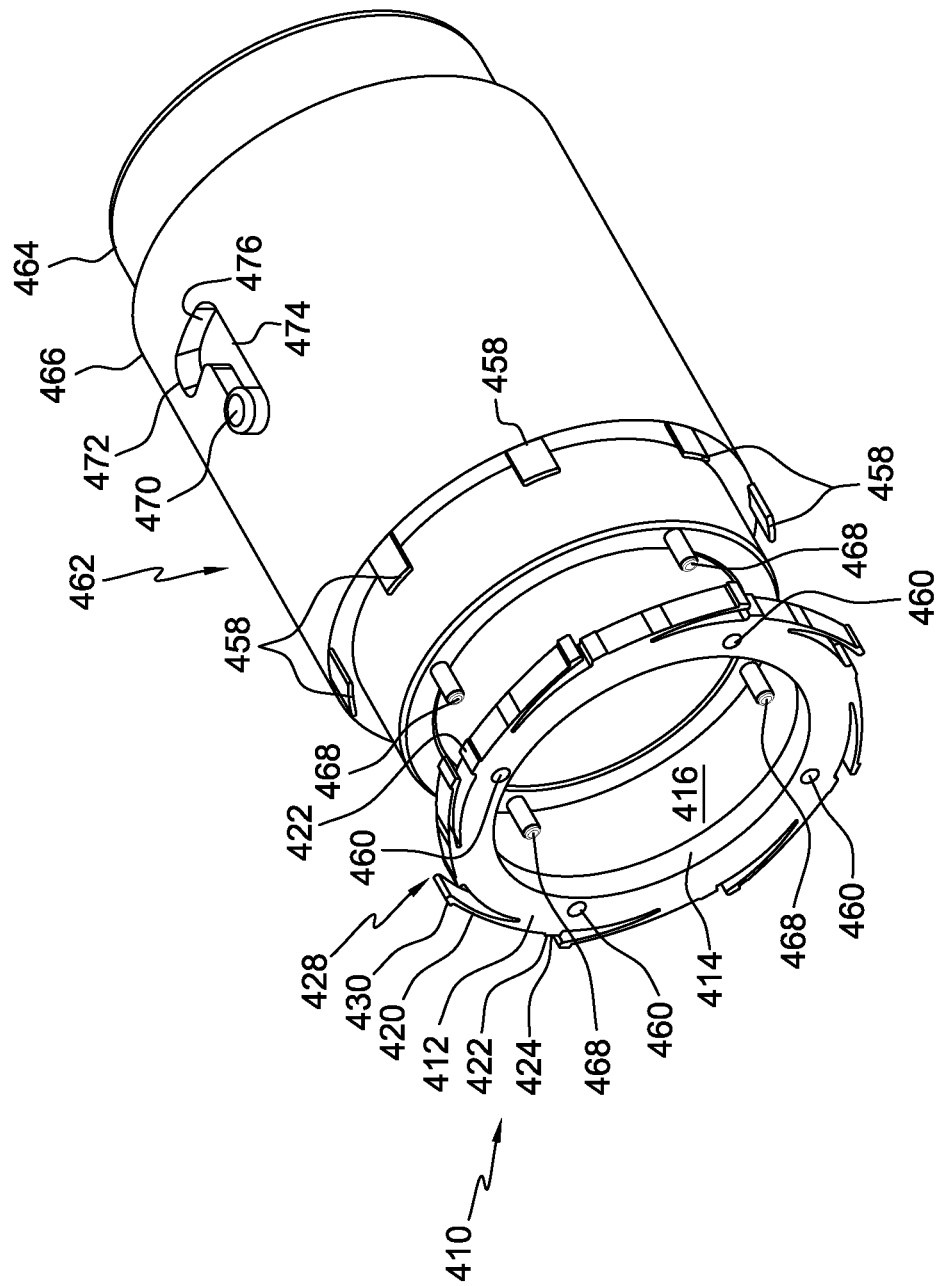
FIGS. 22-27 illustrate exemplary methods of installing and uninstalling the exemplary radial spring of FIG. 21 between adjacent concentric components.

As shown in FIGS. 22-27, an exemplary third deforming device 462 may be utilized with the exemplary radial spring 410 to deflect the resilient members 420 and facilitate installing and uninstalling of the radial spring 410 with an adjacent concentric component, such as an adjacent concentric outer component. As shown in FIG. 22, the exemplary third deforming device 462 may include an inner cylindrical member 464 and an outer cylindrical member 466 that are concentrically or telescopically arranged. In some embodiments, the inner cylindrical member 464 may include a plurality axially-extending pins 468 extending from an axial end thereof. The axially-extending pins 468 may be configured to penetrate the apertures 460 of the radial spring 410. As such, the axially-extending pins 468 of the inner cylindrical member 464 and the apertures 460 of the radial spring 410 may be any corresponding shape, size or configuration that allows the pins 468 to be positioned within the apertures 460.

Similar to the second deforming device 354 described above, the outer cylindrical member 466 may include a plurality of axially extending members or fingers 458 extending from an axial end, a shown in FIG. 22. The axially extending members 458 may be spaced about the circumference of the outer cylindrical member 466, as shown in FIG. 22. As also shown in FIG. 22, the axially extending members 458 may be sized, shaped and otherwise configured to abut or mate with the exterior of the resilient members 420, such as proximate the support members 422.

As also shown in FIG. 22, the inner cylindrical member 464 may include a pin 470 that extends at least partially through a shaped aperture 472 of the outer cylindrical member 466. In some embodiments, as shown in FIG. 22, the shaped aperture 472 of the outer cylindrical member 466 may include an axially extending portion 474 and a circumferentially extending portion 476. As explained further below, the third deforming device 462 may be configured such that the controlled axial and rotational translation of the outer cylindrical member 466 and inner cylindrical member 464 with respect to each other deflects the resilient members to facilitate installing or uninstalling the radial spring 410.

Figure 23:
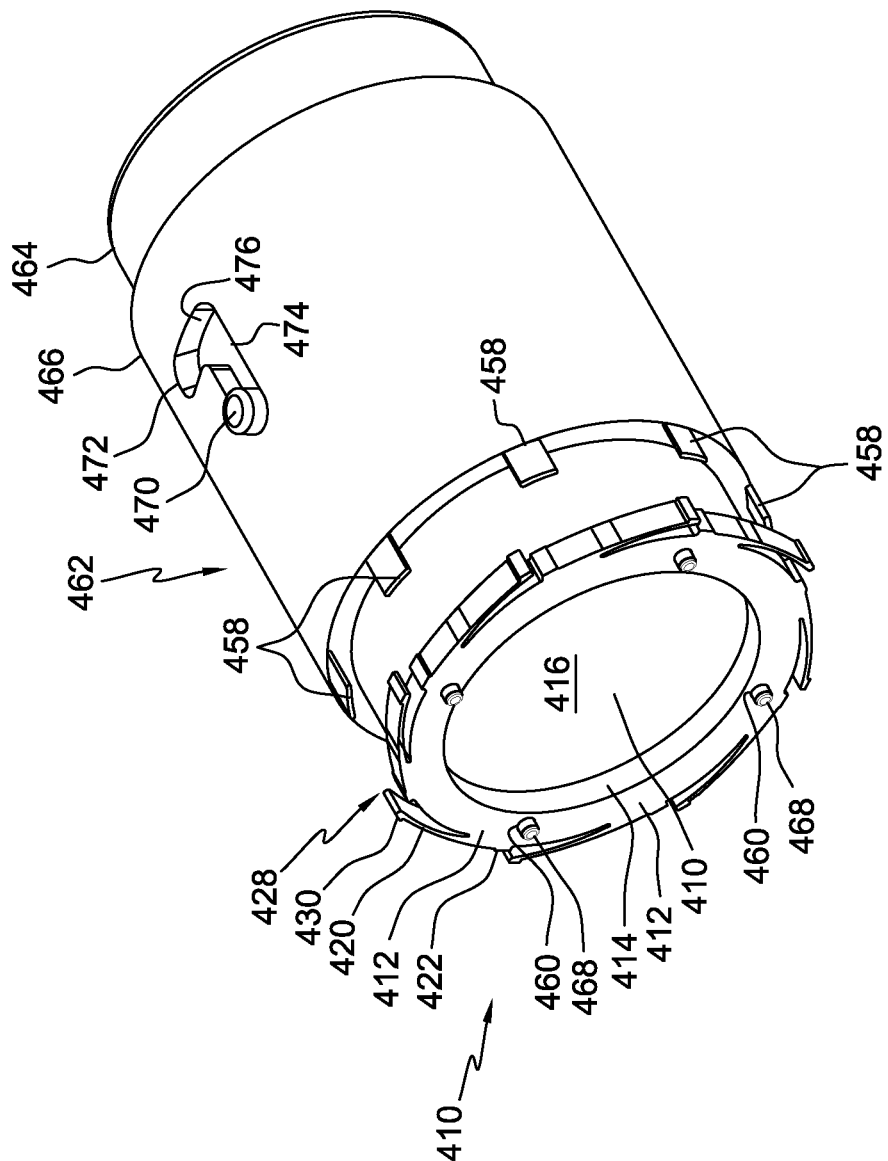

In some embodiments, as shown in FIG. 23, the pins 460 of the inner cylindrical member 464 of the third deforming device 462 may be mated with the corresponding plurality of apertures 460 in the base 412 of the radial spring 412. In such an embodiment, as shown in FIG. 23, the radial spring 412 may thereby be prevented from circumferential rotation or movement with respect to the inner cylindrical member 464.

Figure 24:
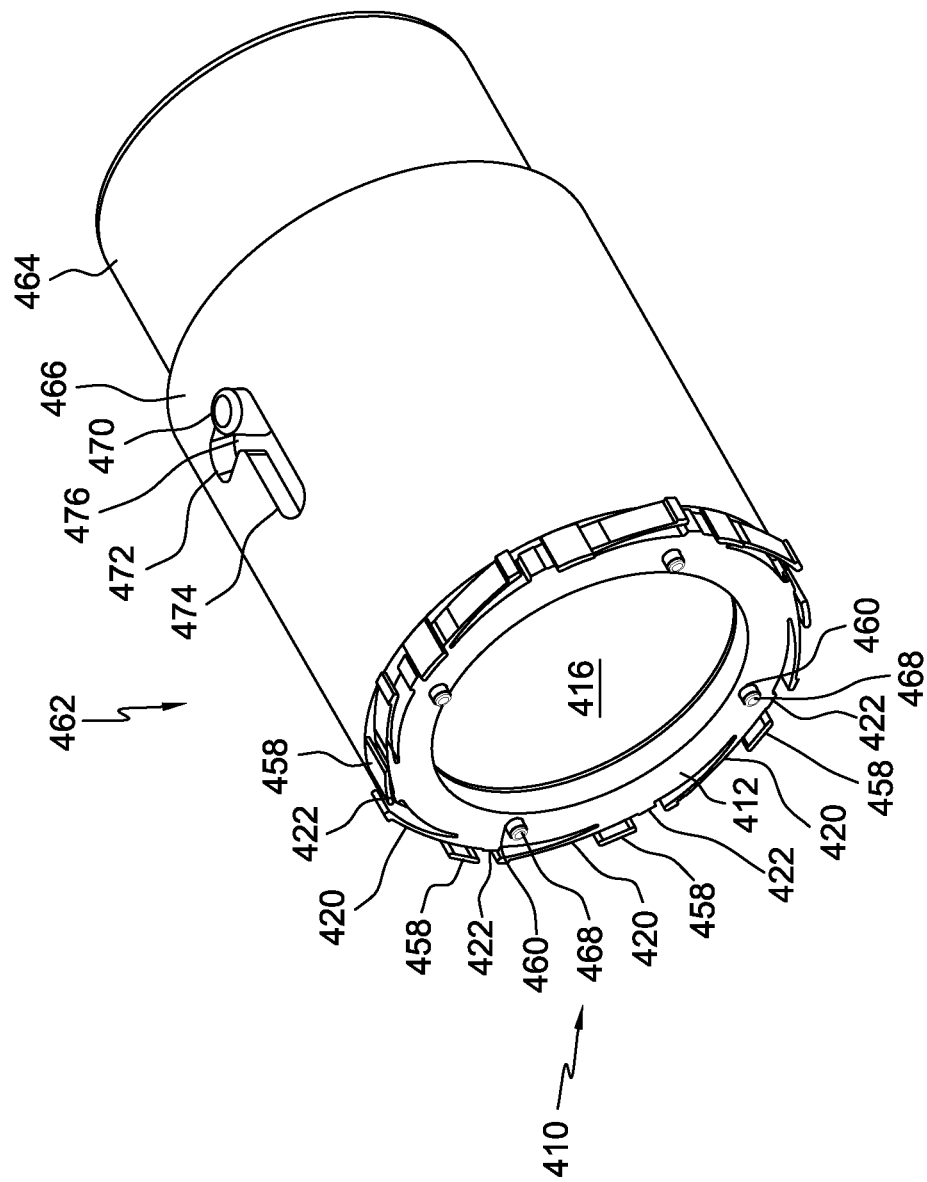
Figure 25:
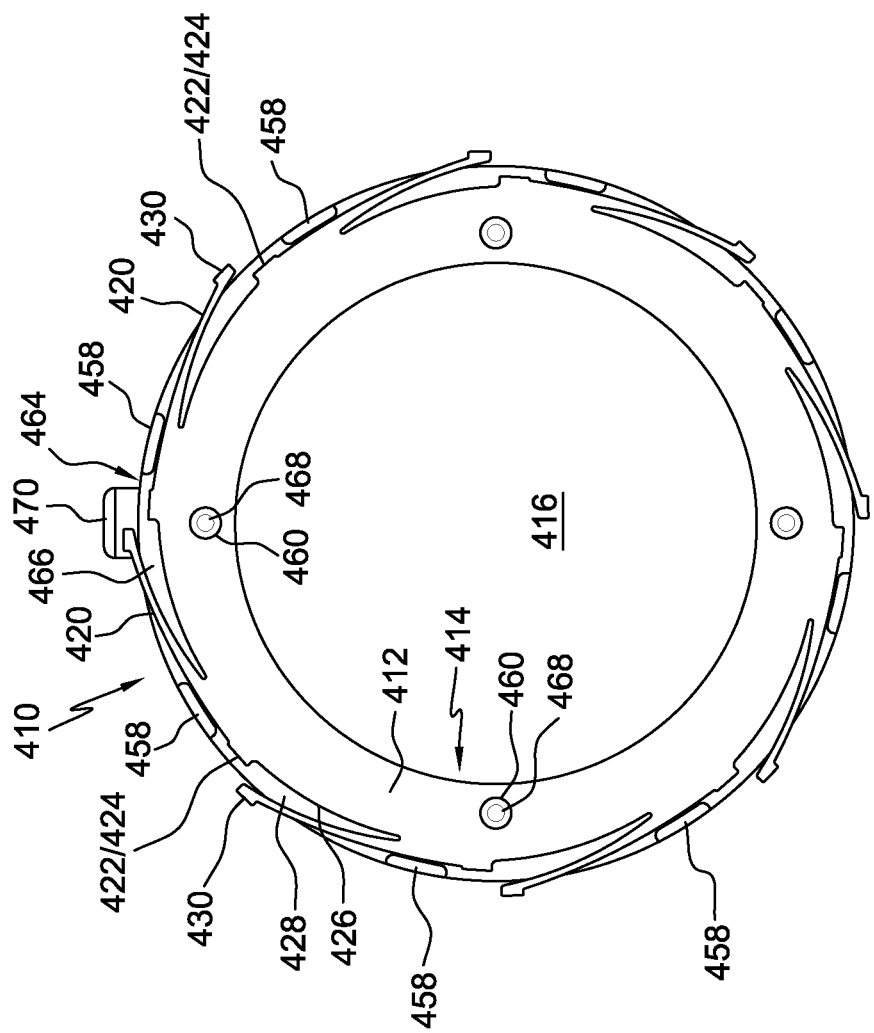

As shown in FIGS. 24 and 25, after the pins 460 of the inner cylindrical member 464 are mated with the corresponding plurality of apertures 460 of the radial spring 412, the outer cylindrical member 466 and inner cylindrical member 464 may be axially translated with respect to each other. The axial translation of the outer cylindrical member 466 and inner cylindrical member 464 may be controlled or dictated by the axial portion 474 of the shaped aperture 472, as shown in FIG. 24. As shown in FIGS. 24 and 25, the third deforming device 462 may be configured such that axial translation of the outer cylindrical member 466 and inner cylindrical member 464 with respect to each other causes the axially extending members 458 to mate with the exterior of the resilient members 420 proximate the support members 422. As discussed above, the second engagement surfaces 424 of the support members 422 may form a gap between an adjacent concentric component and the exterior surface of the resilient members 420. In this way, the third deforming device 462 translates the axially extending members 458 into such gaps or spaces.

Figure 26:
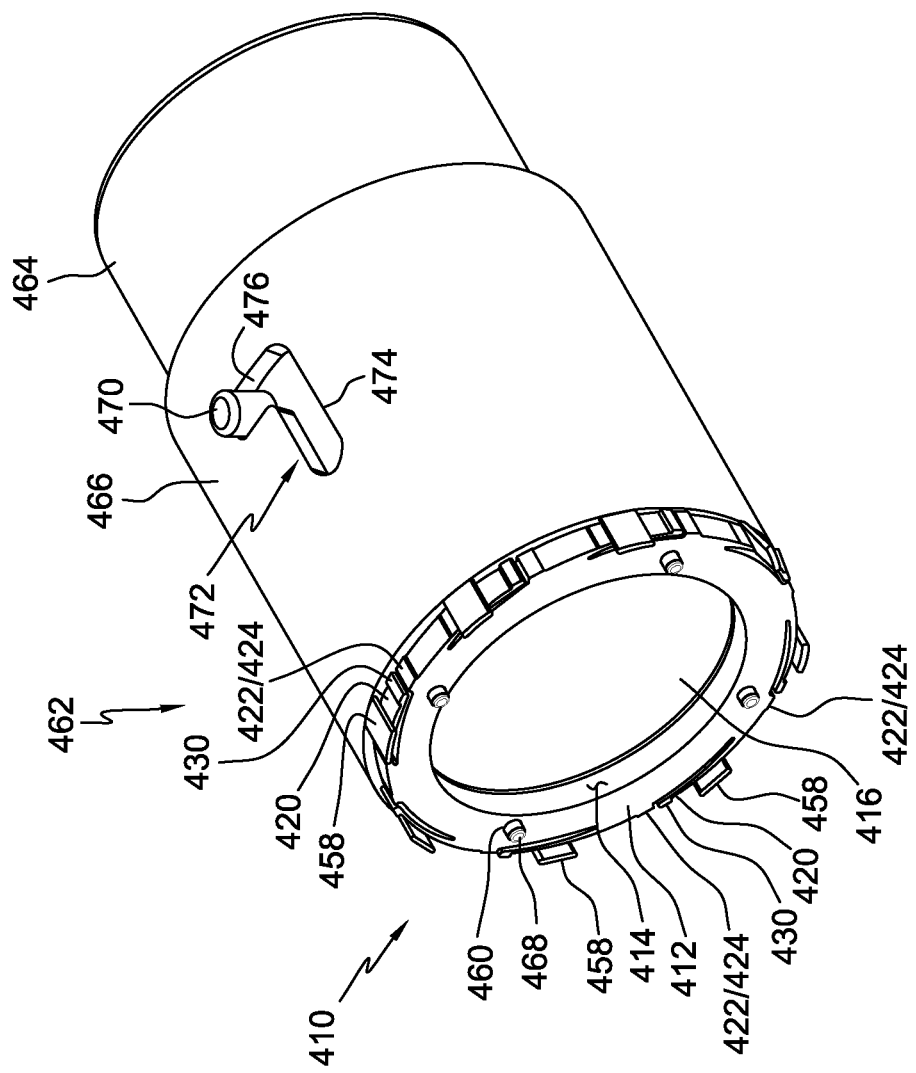
Figure 27:
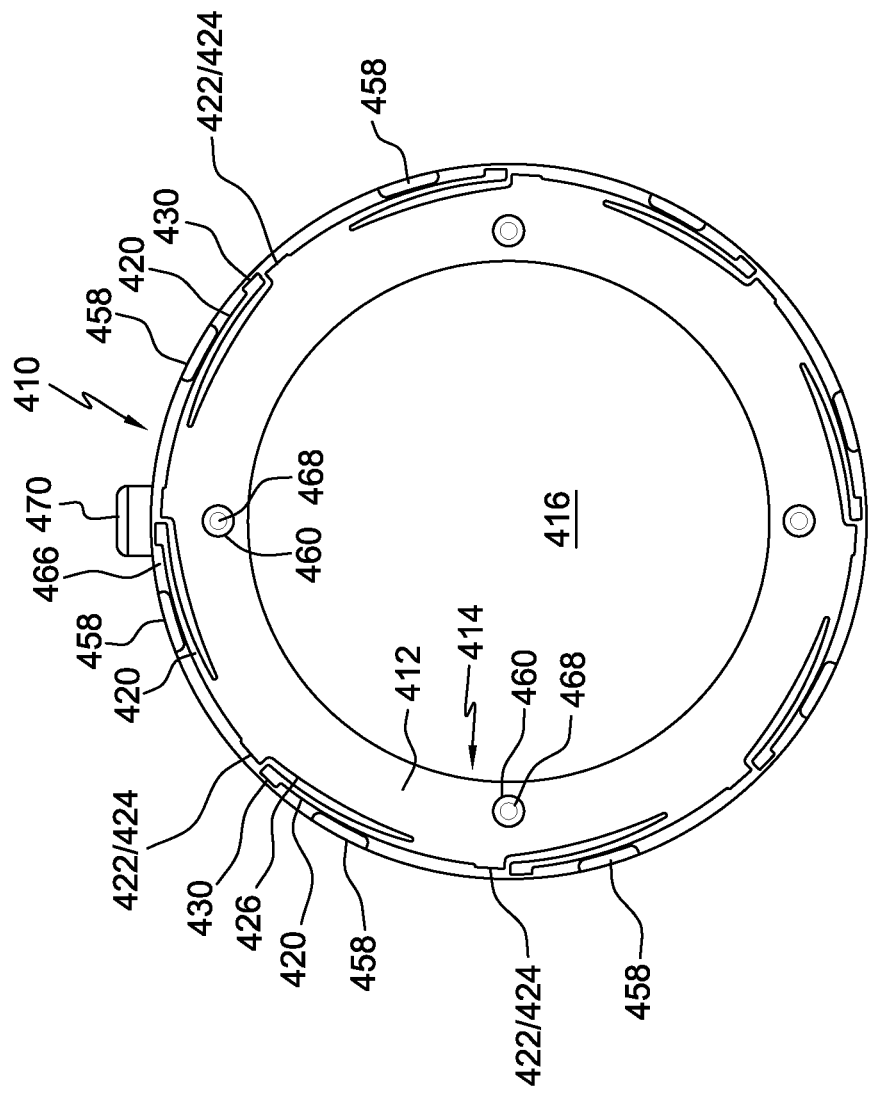

As shown in FIGS. 26 and 27, after the axially extending members 458 mate with the exterior of the resilient members 420 proximate the support members 422, the outer cylindrical member 466 and inner cylindrical member 464 may be rotated about the axis X-X with respect to each other. The rotational translation of the outer cylindrical member 466 and inner cylindrical member 464 about the axis X-X may be controlled or dictated by the circumferentially extending portion 476 of the shaped aperture 472, as shown in FIG. 26. As shown in FIGS. 26 and 27, the third deforming device 462 may be configured such that rotational translation of the outer cylindrical member 466 and inner cylindrical member 464 about the axis X-X with respect to each other causes the axially extending members 458 to ride along the exterior of the resilient members 420 and thereby radially inwardly deflect the resilient members 420 (as the resilient members 420 extend radially outwardly as they extend from the support members 422). In this way, the third deforming device 462 may radially inwardly deflect the resilient members 420 a sufficient amount or degree such that the third engagement members 430 of the radial spring 410 are removed from engagement with an adjacent concentric component, such as not engaged with a groove of an adjacent concentric component. When the third engagement members 430 of the radial spring 410 are removed from within a groove or like feature of an adjacent concentric component, the radial spring 410 and the third deforming device 462 may be axially translated along the corresponding concentric component(s) and, ultimately, off the concentric component(s).

Figure 28:
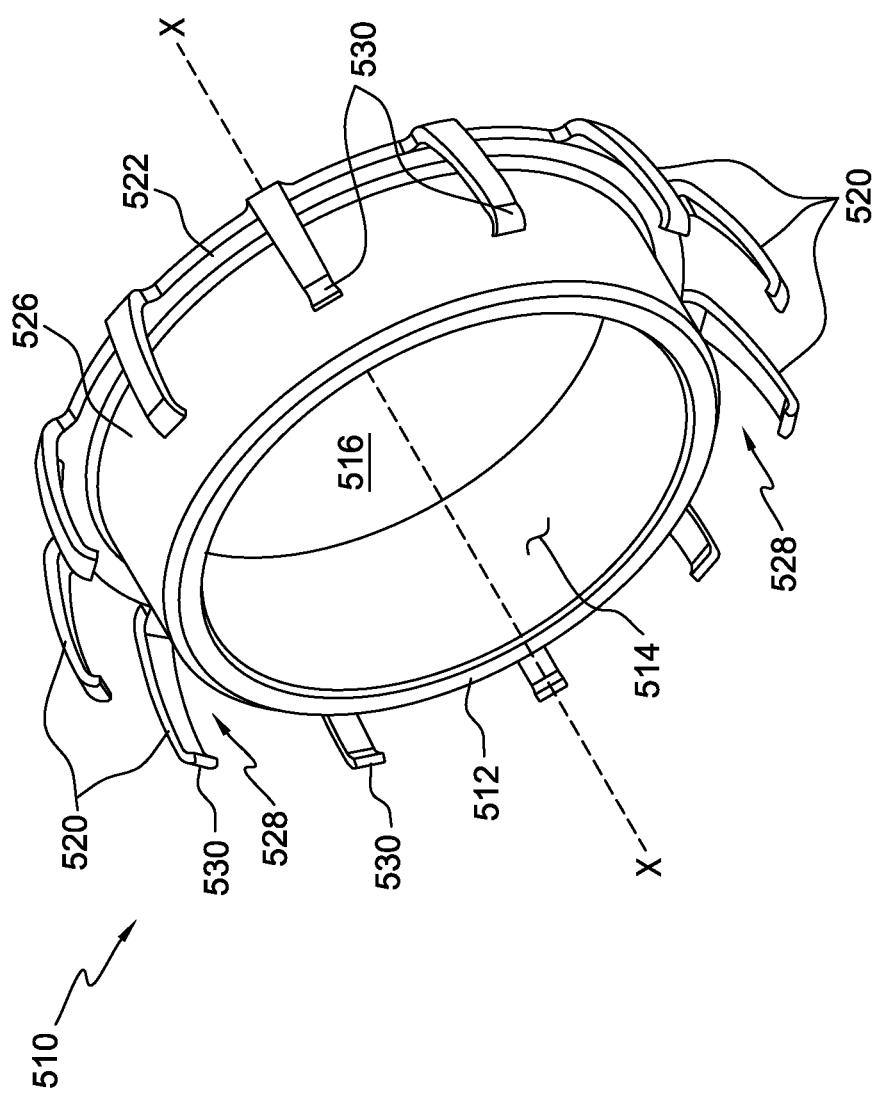
FIG. 28 illustrates a perspective view of another exemplary radial spring according to the present disclosure.

In FIG. 28, another exemplary radial spring embodiment of the present invention is indicated generally by the reference numeral 510. The radial spring 510 is similar to the radial springs 10, 110, 210, 310 and 410 described above with reference to FIGS. 1-27, and therefore like reference numerals preceded by the numeral "5" are used to indicate like elements, functions, aspects or the like. As shown in FIG. 28, a difference between the radial spring 510 and the radial springs 10, 110, 210, 310 and 410 described above is the orientation of the resilient members 520.

Figure 29:
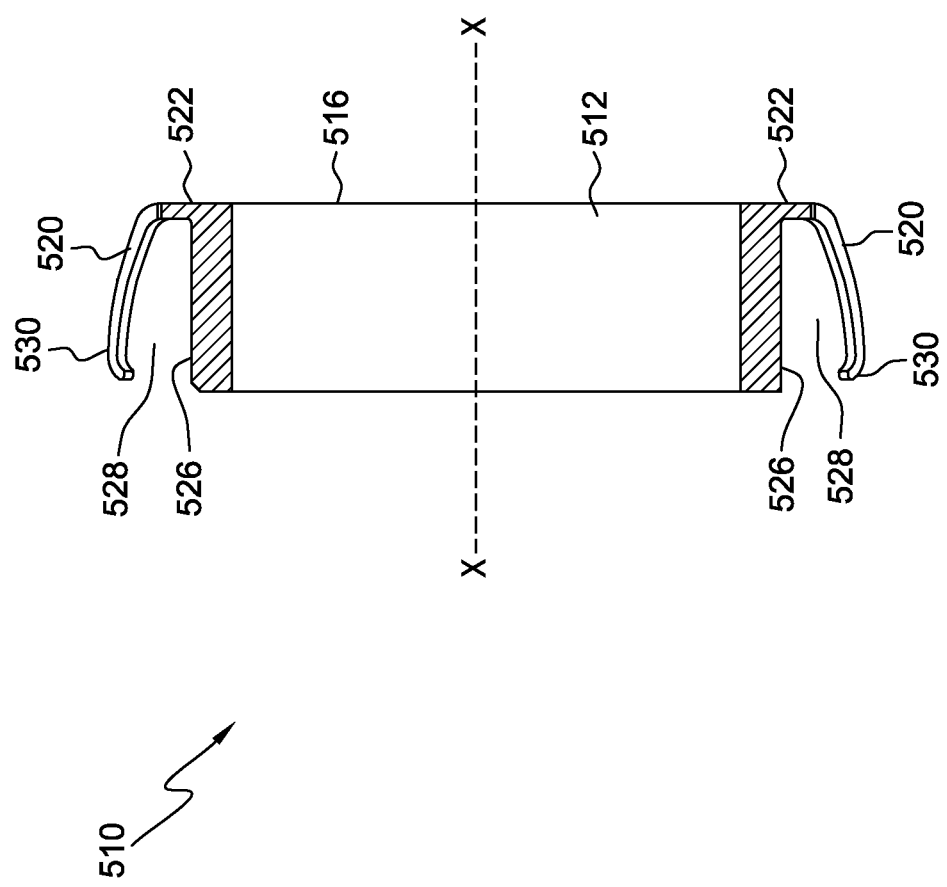
FIG. 29 illustrates a side cross-sectional view of the exemplary radial spring of FIG. 28.

As shown in FIGS. 28 and 29, the exemplary radial spring 510 includes a base portion 512, a support member 522 extending from a side of the base portion 512, and a plurality of resilient members 520 extending from the support member 522 that are spaced about the radial spring 510 about the axis X-X. In some embodiments, the radial spring 510 may be of one-piece construction such that the components or portions of the radial spring 510 are integral. In some such embodiments, the radial spring 510 may be machined from a single workpiece. As shown in FIGS. 28 and 29, the resilient members 520 may extend substantially axially or longitudinally (e.g., parallel to the axis X-X). The resilient members 520 may extend substantially radially as they extend axially from the support member 522, as shown in FIGS. 28 and 29. The tip or end portion of each resilient member 520 may be positioned furthest in the radial direction (inwardly or outwardly depending upon the orientation of the radial spring 510) from the base member 512. Thereby, the tip or end portion of each resilient member 520 may define the third engagement surface 530 of the radial spring 510, as shown in FIG. 29. In some embodiments, the resilient members 520 may extend radially from the support member 522, and thereby the support member 522 may be void of a second support surface.

As noted above, the exemplary radial spring 510 may include the support member 522 and the plurality of resilient members 520 extending from either the radially inward or outward facing surface of the base portion 512. As shown in FIG. 29, in some embodiments the resilient members 520 may extend axially at least a similar distance than the base portion 512. In some embodiments, as shown in FIG. 28, the resilient members 520 may be relatively thin and spaced about the axis X-X. For example, the spacing between adjacent resilient members 520 about the axis X-X may be greater than the width of the resilient members 520 measured about the axis X-X, as shown in FIG. 28. In another example, as shown in FIG. 28, the majority of the surface area about the radial spring 510 extending about the axis X-X at the resilient members 520 may comprise the gaps or spaces between the resilient members 520 (as opposed to the resilient members 520 themselves).

Figure 30:
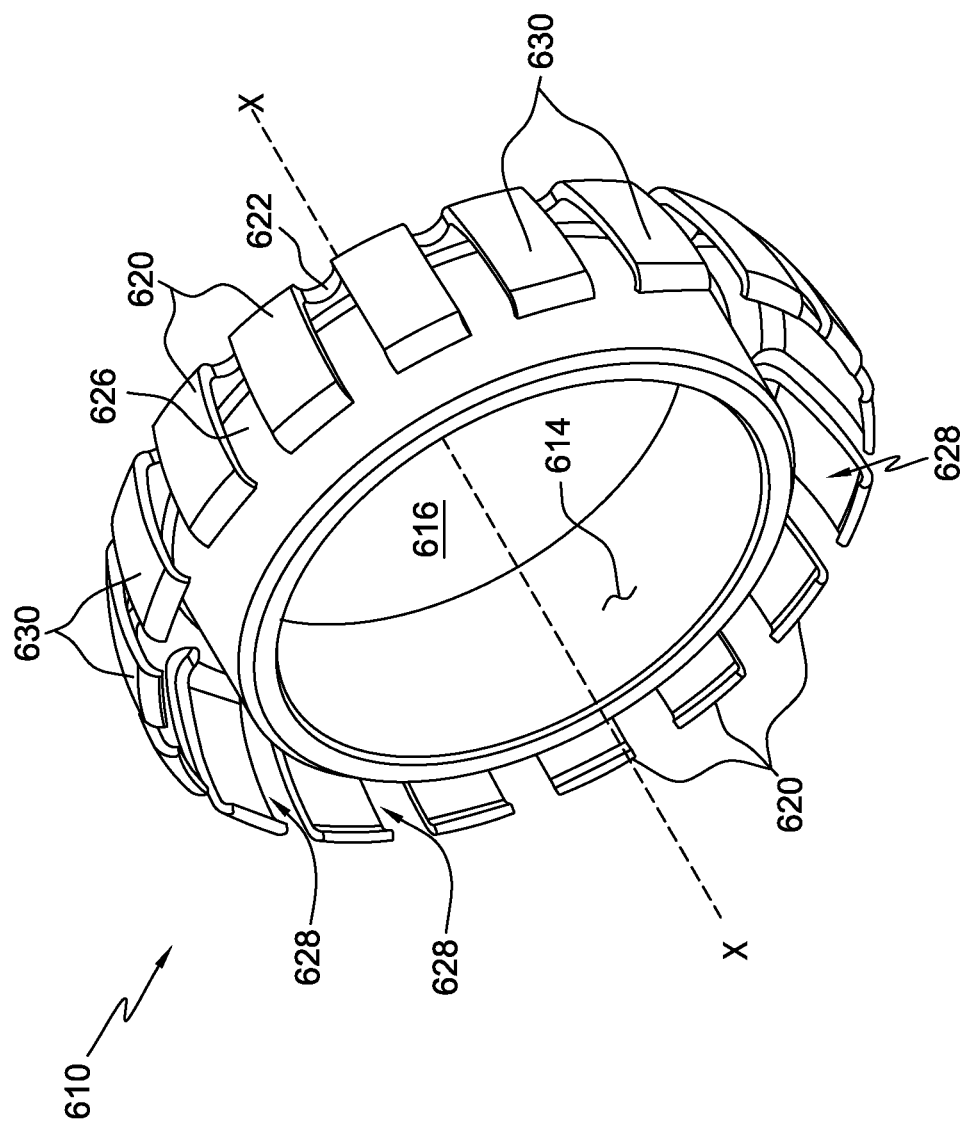
FIG. 30 illustrates a perspective view of another exemplary radial spring according to the present disclosure.

In FIG. 30, another exemplary radial spring embodiment of the present invention is indicated generally by the reference numeral 610. The radial spring 610 is similar to the radial springs 10, 110, 210, 310, 410 and 510 described above with reference to FIGS. 1-29, and therefore like reference numerals preceded by the numeral "6" are used to indicate like elements, functions, aspects or the like. The radial spring 610 is particularly substantially similar to the radial spring 510 of FIGS. 28 and 29. A difference between radial spring 610 and radial spring 510 is the design of the resilient members 620. For example, as shown in FIG. 30, the resilient members 620 of radial spring 610 are relatively wide in the direction about the axis X-X direction and a relatively large number of resilient members 620 are included. In some embodiments, as shown in FIG. 30, the spacing between adjacent resilient members 620 about the axis X-X may be less than the width of the resilient members 620 measured about the axis X-X. In some embodiments, as shown in FIG. 30, the majority of the surface area of the radial spring 620 extending about the axis X-X at the resilient members 620 may comprise the resilient members 620 themselves (rather than the gaps between the resilient members 620).

Figure 31:
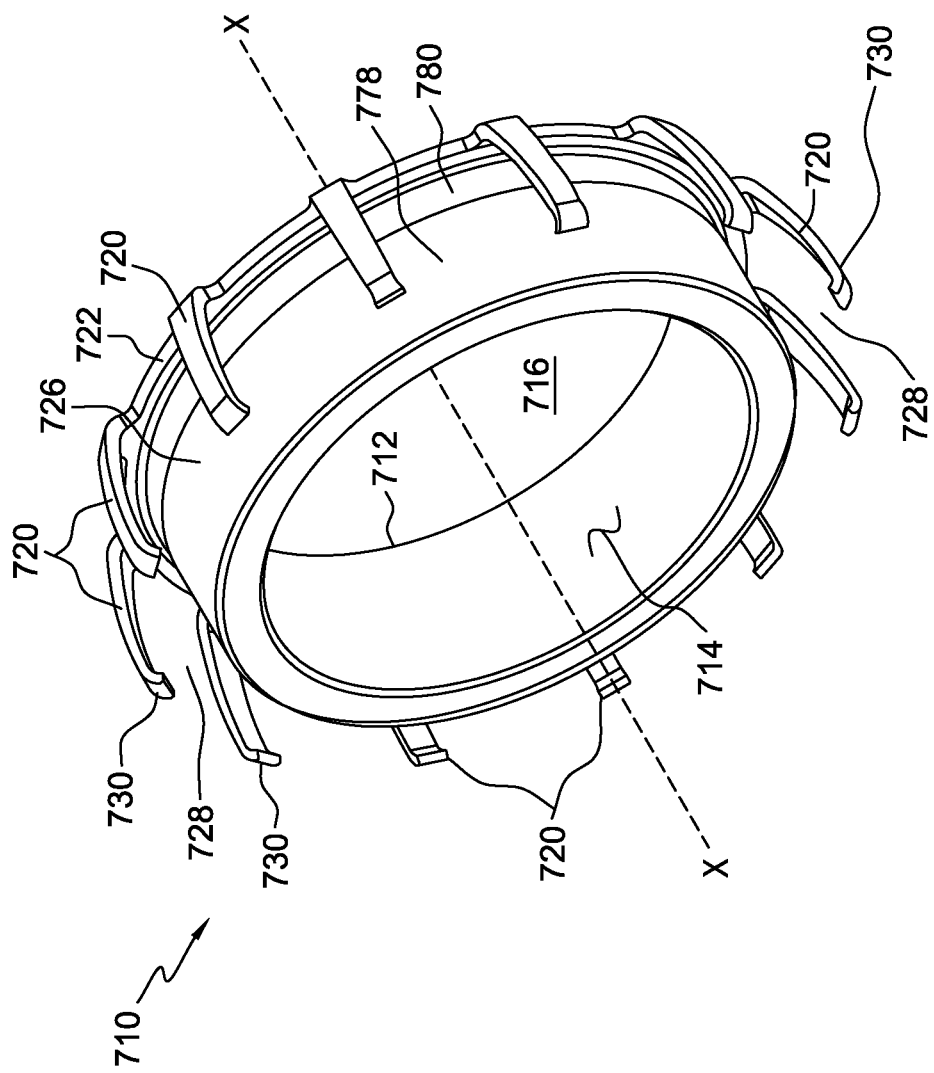
FIG. 31 illustrates a perspective view of another exemplary radial spring according to the present disclosure.
Figure 32:
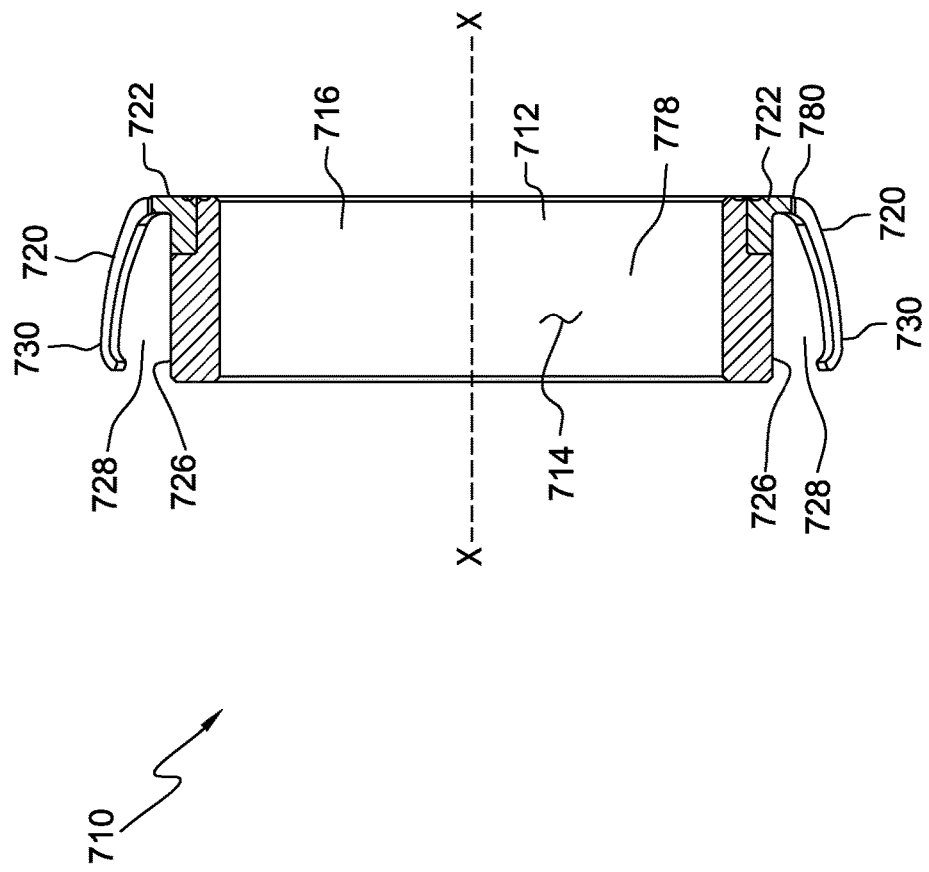
FIG. 32 illustrates a side cross-sectional view of the exemplary radial spring of FIG. 31.

In FIGS. 31 and 32, another exemplary radial spring embodiment of the present invention is indicated generally by the reference numeral 710. The radial spring 710 is similar to the radial springs 10, 110, 210, 310, 410, 510 and 610 described above with reference to FIGS. 1-30, and therefore like reference numerals preceded by the numeral "7" are used to indicate like elements, functions, aspects or the like. The radial spring 710 is substantially similar to the radial spring 510 of FIGS. 28 and 29. A difference between radial spring 710 and radial spring 510 is the construction of the base portion 712, support member 722 and resilient members 720.

As shown in FIGS. 31 and 32, the base portion 712 of the radial spring 710 is a first discrete, integral component 778, and the support member 722 and resilient members 720 are formed by a second discrete, integral component 780. In some embodiments, the first discrete, integral component 778 (base portion 712) and the second discrete, integral component 780 (support member 722 and resilient members 720) may be coupled together, such as before installation between adjacent concentric components (as discussed above). For example, in some embodiments the first component 778 and the second component 780 may be press fit and/or welded together.

Figure 33:
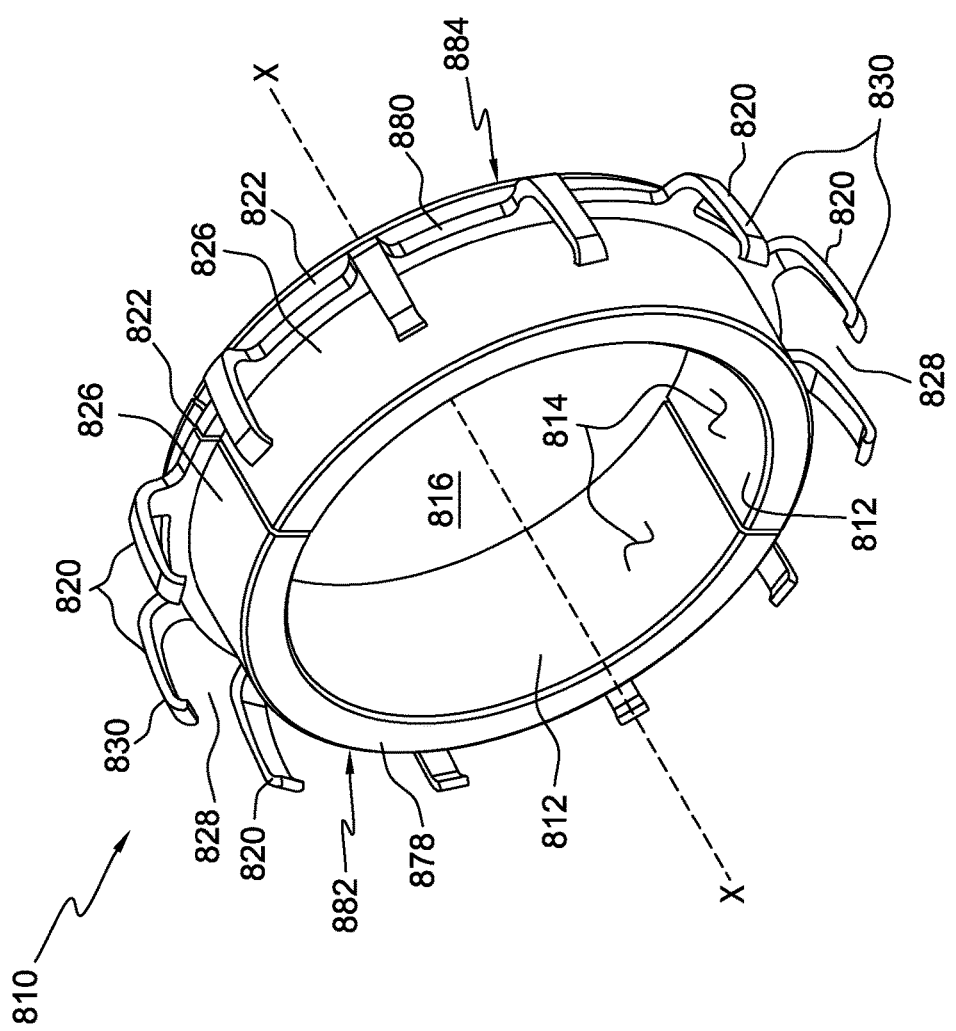
FIG. 33 illustrates a perspective view of another exemplary radial spring according to the present disclosure.

In FIG. 33, another exemplary radial spring embodiment of the present invention is indicated generally by the reference numeral 810. The radial spring 810 is similar to the radial springs 10, 110, 210, 310, 410, 510, 610 and 710 described above with reference to FIGS. 1-32, and therefore like reference numerals preceded by the numeral "8" are used to indicate like elements, functions, aspects or the like. The radial spring 810 is substantially similar to the radial spring 710 of FIGS. 31 and 32. A difference between radial spring 810 and radial spring 710 is the segmented design of the radial spring 810. For example, radial spring 810 may comprise a plurality of segments that, when assembled, form a ring-shape. In the exemplary embodiment shown in FIG. 33, the radial spring 810 is formed by a first radial spring segment 882 and a second radial spring segment 884. In some embodiments, the first segment 882 and second segment 884 are semicircle-shaped. In some embodiments, the first segment 882 and second segment 884 of the radial spring 810 may be coupled together before the radial spring segments are formed.

Figure 34:
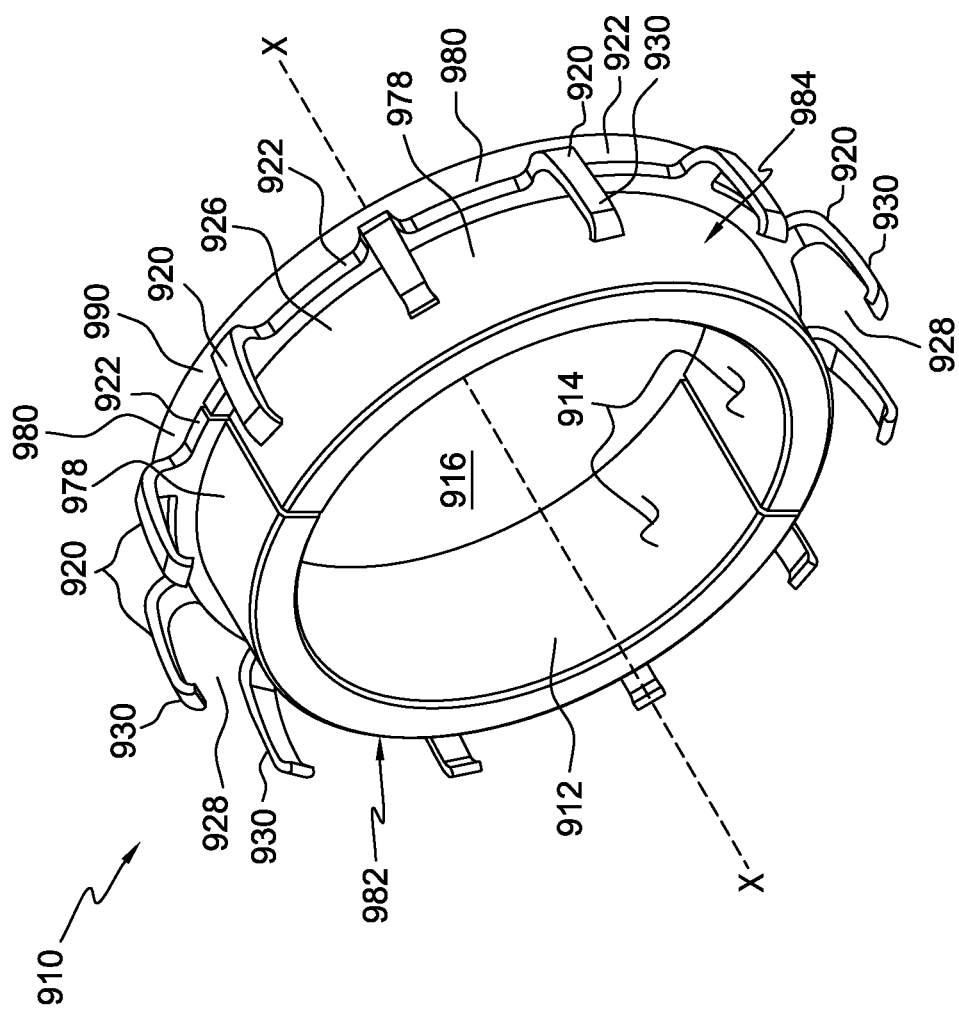
FIG. 34 illustrates a perspective view of the exemplary radial spring of FIG. 33 including a retaining member.
Figure 35:
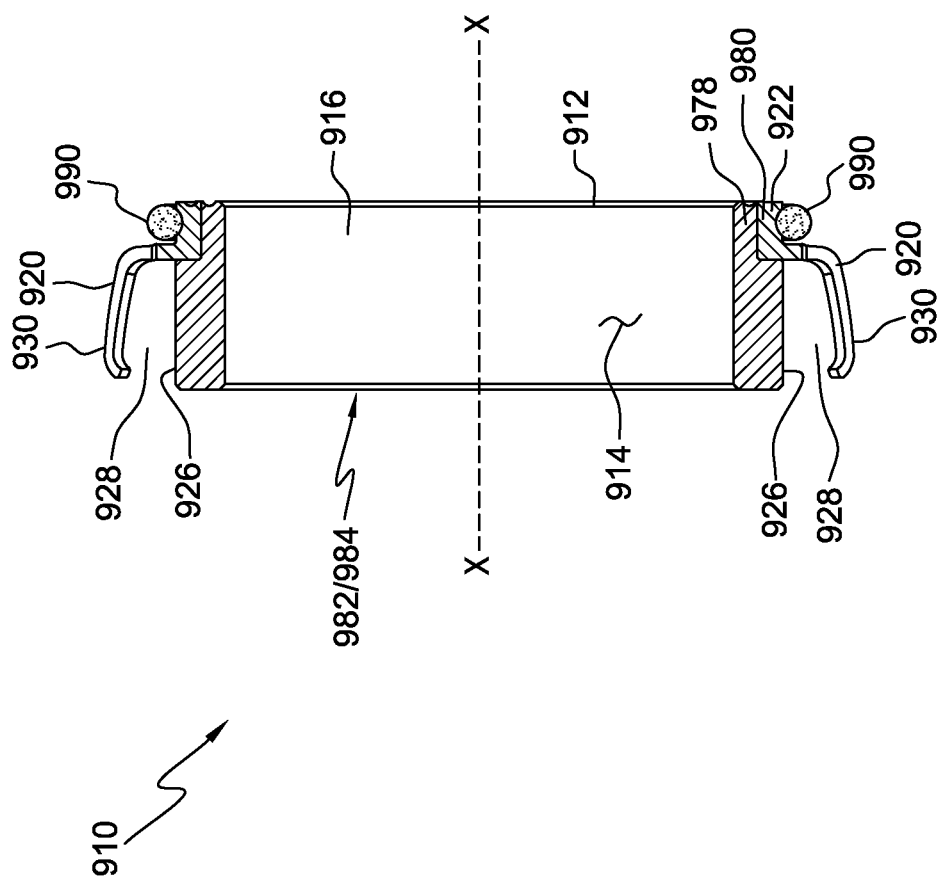
FIG. 35 illustrates a side cross-sectional view of the exemplary radial spring of FIG. 34.

In FIGS. 34 and 35, another exemplary radial spring embodiment of the present invention is indicated generally by the reference numeral 910. The radial spring 910 is similar to the radial springs 10, 110, 210, 310, 410, 510, 610, 710 and 810 described above with reference to FIGS. 1-33, and therefore like reference numerals preceded by the numeral "9" are used to indicate like elements, functions, aspects or the like. The radial spring 910 is substantially similar to the radial spring 810 of FIG. 33. A difference between radial spring 910 and radial spring 810 is the inclusion of a retaining member 990. In some embodiments, the retaining member 990 may at least aide in coupling the first segment 982 and second segment 984 together.

As shown in FIGS. 34 and 35, the radial spring 910 may include a retaining member 990 that extends radially about the first segment 982 and second segment 984 (i.e., the radial spring 910). In some embodiments, the retaining member 990 may abut the first component 978, as shown in FIGS. 34 and 35. As also shown in FIGS. 34 and 35, in some embodiments the retaining member 990 may extend radially about and/or abut the support member portion 922 of the first component 978. In some embodiments, the retaining member 990 may be an o-ring. In some other embodiments, the retaining member 990 may be any member or combination of members capable of at least partially coupling the first segment 982 and second segment 984.

Figure 36:
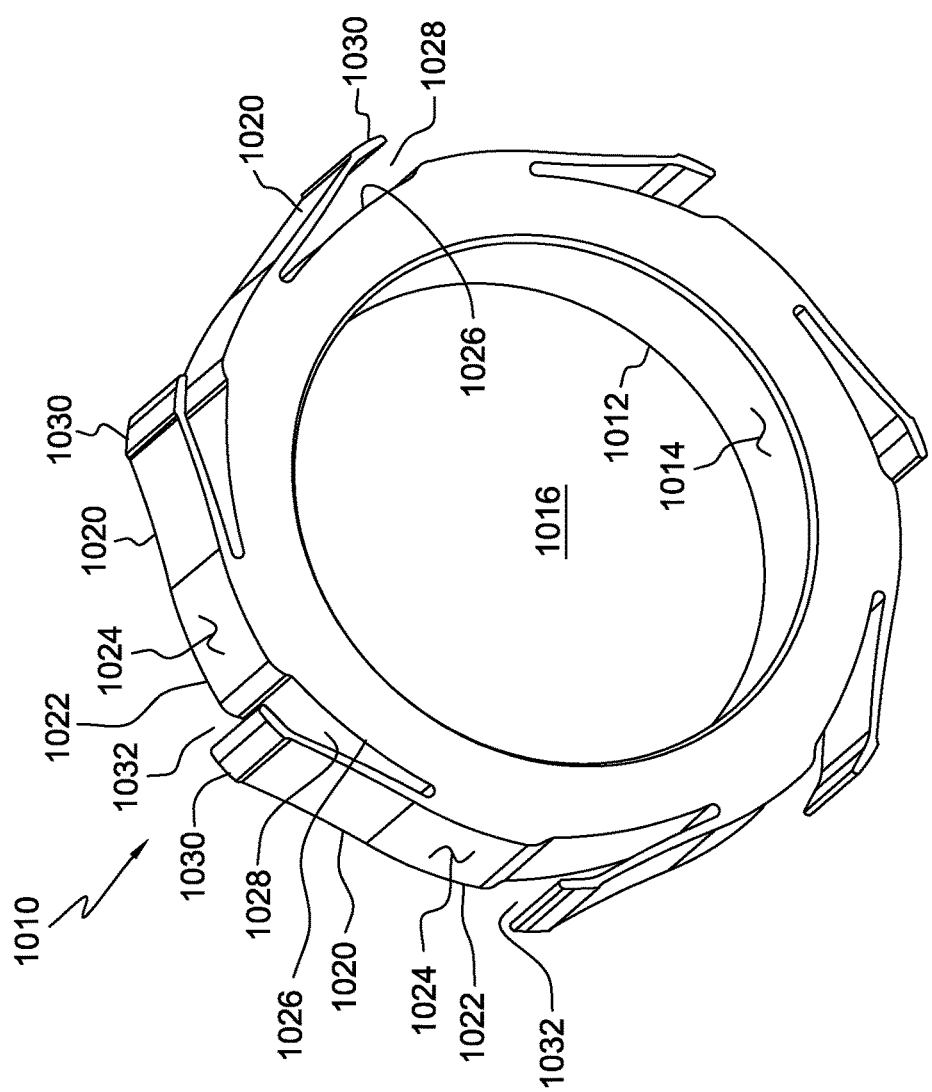
FIG. 36 illustrates a perspective view of another exemplary radial spring according to the present disclosure.
Figure 37:
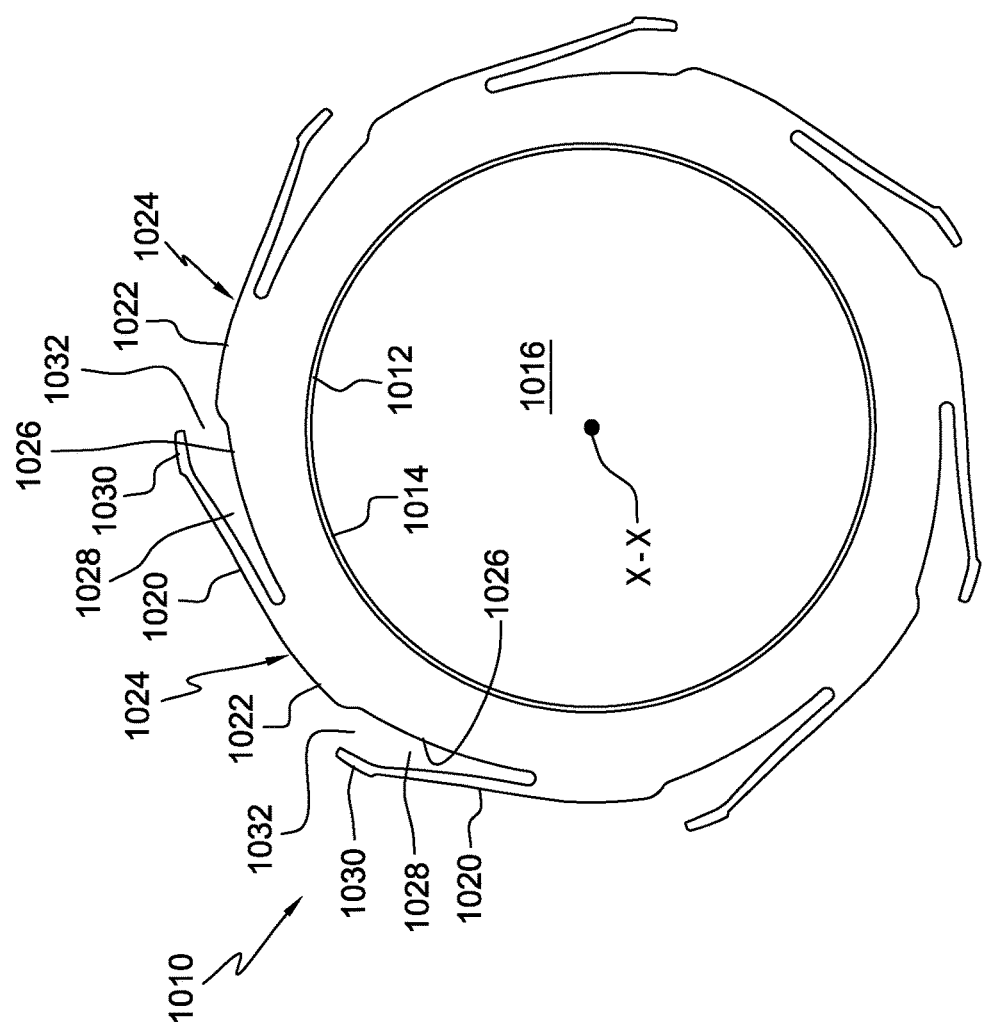
FIG. 37 illustrates a side view of the exemplary radial spring of FIG. 36.

In FIGS. 36 and 37, another exemplary radial spring embodiment of the present invention is indicated generally by the reference numeral 1010. The radial spring 1010 is similar to the radial springs 10, 110, 210, 310, 410, 510, 610, 710, 810 and 910 described above with reference to FIGS. 1-35, and therefore like reference numerals preceded by the numeral "9" are used to indicate like elements, functions, aspects or the like. The radial spring 1010 is substantially similar to the radial spring 410 of FIGS. 21-27. A difference between radial spring 1010 and radial spring 410 is the configuration of the resilient members 1020. As shown in FIGS. 36 and 37, in some embodiments the resilient members 1020 may be curved or arcuate. In some such embodiments, the arcuate shape of the resilient members 1020 may be defined by one or more radius. In some embodiments, the resilient members 1020 may generally curve radially outwardly away from the axis X-X, and thereby also the base 1012, as they extend from the support members or portions 1022. In this way, the resilient members 1020 may be concaved radially with respect to the exterior of the radial spring 1010. The curvature of the arcuate resilient members 1020 in the radial direction may increase the space 1028 between each resilient member 1020 and the exterior side or surface 1026 of the base 1012 (and thereby total potential travel of the resilient members 1020) as compared to embodiments that include substantially linear resilient members 1020 (e.g., radial spring 410 of FIGS. 21-27). Similarly, the curvature of the arcuate resilient members 1020 in the radial direction may increase the space or radial thickness between the third engagement surface 1030 each resilient member 1020 and the first engagement surface of the base 1012 as compared to embodiments that include substantially linear resilient members 1020 (e.g., radial spring 410 of FIGS. 21-27).

It is to be understood that the above description is intended to be illustrative, and not restrictive. Numerous changes and modifications may be made herein by one of ordinary skill in the art without departing from the general spirit and scope of the invention as defined by the following claims and the equivalents thereof. For example, the above-described embodiments (and/or aspects thereof) may be used in combination with each other. In addition, many modifications may be made to adapt a particular situation or material to the teachings of the various embodiments without departing from their scope. While the dimensions and types of materials described herein are intended to define the parameters of the various embodiments, they are by no means limiting and are merely exemplary. Many other embodiments will be apparent to those of skill in the art upon reviewing the above description. The scope of the various embodiments should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Also, the term "operably" in conjunction with terms such as coupled, connected, joined, sealed or the like is used herein to refer to both connections resulting from separate, distinct components being directly or indirectly coupled and components being integrally formed (i.e., one-piece, integral or monolithic). Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure. It is to be understood that not necessarily all such objects or advantages described above may be achieved in accordance with any particular embodiment. Thus, for example, those skilled in the art will recognize that the systems and techniques described herein may be embodied or carried out in a manner that achieves or optimizes one advantage or group of advantages as taught herein without necessarily achieving other objects or advantages as may be taught or suggested herein.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the disclosure may include only some of the described embodiments. Accordingly, the invention is not to be seen as limited by the foregoing description, but is only limited by the scope of the appended claims.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

We claim:

1. A radial spring for controlling radial forces between first and second concentric components, comprising:
a ring-shaped base portion having an axis, said base portion having an innermost radial surface circumferentially bounding an inner aperture and an outermost radial surface bounding a space;
a plurality of support portions, each support portion of the plurality of support portions being circumferentially bounded by opposite circumferential outer surfaces of said base portion;
a plurality of resilient member portions;
a first resilient member portion of said plurality of resilient member portions connecting to, and extending from, a first support portion and a second support portion of the plurality of support portions, said first support portion and said second support portion circumferentially separated from each other relative to the axis;

wherein the base portion, the plurality of support portions and the plurality of resilient member portions are oriented about the axis of the base portion, and wherein each resilient member portion of the plurality of resilient member portions is resiliently deformable along a radial direction with respect to the axis to exert an opposing radial force in response to a radial deformation caused by a force applied to each resilient member portion; and wherein said first resilient member portion of said plurality of resilient member portions is radially separated from said base portion by said space to allow radial movement of said first resilient member portion into said space in response to the force being applied to each resilient member portion, said space bounded only by radial interior surfaces of said first resilient member portion, said outermost radial surface of said base portion, a first circumferential outer surface of said first support portion at a first circumferential end of said space and a second circumferential outer surface of said second support portion at a second circumferential end of said space;

wherein said base portion is formed monolithically and is uninterrupted by spacing in a radial direction between said innermost radial surface and said outermost radial surface; and wherein said first resilient member portion comprises an engagement surface for engaging the second component, said engagement surface extending radially outwardly from said first resilient member, and located between said first support portion and said second support portion.

2. The radial spring of claim 1, wherein the innermost radial surface and the engagement surface are substantially opposing surfaces along the radial direction.

3. The radial spring of claim 1, wherein the first engagement surface substantially faces outwardly or inwardly along the radial direction with respect to the axis, and wherein the second engagement surface substantially faces the other of outwardly or inwardly along the radial direction with respect to the axis as compared to the first engagement surface.

4. The radial spring of claim 1, wherein said plurality of resilient member portions is formed monolithically relative to said base portion and said at least one support portion.

5. The radial spring of claim 1, wherein the plurality of support portions extend radially outwardly from the base portion further radially outwardly than said plurality of resilient member portions.

6. The radial spring of claim 5, wherein the plurality of support portions includes a plurality of support portions spaced about the axis, and wherein the resilient member portions extend from at least one of the plurality of support portions at an angle relative to the axis.

7. The radial spring of claim 1, wherein the resilient member portions include a radially extending portion.

8. The radial spring of claim 7, wherein the radially extending portions of the resilient member portions define a second engagement surface for engaging the second component.

9. The radial spring of claim 1, wherein the radial spring is ring-shaped.

10. The radial spring of claim 1, wherein the radial spring is of one-piece construction.

11. The radial spring of claim 1, wherein said first support portion comprises a first support engagement surface and said second support portion comprises a second support engagement surface, said first support engagement surface and said second support engagement surface extending further radially outwardly than said first resilient member portion.

12. A method of controlling radial forces between first and second concentric components, comprising:
obtaining a radial spring including a base portion having an axis, a plurality of support portions extending continuously radially outwardly from the base portion to outermost extents of the plurality of support portions, and a first resilient member portion of a plurality of resilient member portions extending from, and connected to, a first support portion and a second support portion of the plurality of support portion portions, the first support portion and the second support portion circumferentially separated from each other, wherein an internal aperture is only bounded by the base portion, the first support portion, the second support portion and the first resilient member portion, and wherein the plurality of resilient member portions are resiliently deformable along a radial direction with respect to the axis;
elastically deforming the plurality of resilient member portions along the radial direction;
positioning the radial spring concentrically between the first and second concentric components; and
releasing at least a portion of the elastic deformation of the plurality of resilient member portions such that the plurality of resilient member portions engage one of the first and second concentric components and the base portion engages the other of the first and second concentric components as compared to the resilient member portions;
wherein said first support portion comprises a first support engagement surface and said second support portion comprises a second support engagement surface, said first support engagement surface and said second support engagement surface extending further radially outwardly than said first resilient member portion; and
wherein each support portion of said plurality of support portions is circumferentially bounded by opposite circumferential outer surfaces of said base portion.

13. The method of claim 12 wherein a first resilient member portion of the plurality of resilient member portions comprises a resilient member portion engagement surface for engaging the second component, said resilient member portion engagement surface extending radially outwardly from said first resilient member, and located between said first support portion and said second support portion.

14. A radial spring for controlling radial forces between first and second concentric components, comprising:
a base portion;
a plurality of support portions extending radially outwardly from the base portion to outermost extents of said plurality of support portions, each support portion of said plurality of support portions being circumferentially bounded by opposite circumferential outer surfaces of said base portion; and
a first resilient member portion of a plurality of resilient member portions extending from a first support portion to a second support portion of the plurality of support portions, said plurality of resilient member portions formed monolithically relative to said base portion and said plurality of support portions; and wherein the base portion, the at least one support portion and the plurality of resilient member portions are formed about an axis, and wherein the plurality of resilient member portions are resiliently deformable along a radial direction with respect to the axis to exert an opposing radial force in response to a force causing a deformation;

wherein the first resilient member portion comprises a resilient member portion engagement surface for engaging the second component, said resilient member portion engagement surface extending radially outwardly from said first resilient member, and located between said first support portion and said second support portion.

15. A radial spring for controlling radial forces between first and second concentric components, comprising:
a ring-shaped base portion having an axis, said base portion having an innermost radial surface circumferentially bounding an inner aperture and an outermost radial surface bounding a space;
a plurality of support portions being circumferentially bounded by opposite circumferential outer surfaces of said base portion;
a plurality of resilient member portions;
a first resilient member portion of said plurality of resilient member portions connecting to, and extending from, a first support portion and a second support portion of the plurality of support portions, said first support portion and said second support portion circumferentially separated from each other relative to the axis;
wherein the base portion, the plurality of support portions and the plurality of resilient member portions are oriented about the axis of the base portion, and wherein each resilient member portion of the plurality of resilient member portions is resiliently deformable along a radial direction with respect to the axis to exert an opposing radial force in response to a radial deformation caused by a force applied to each resilient member portion; and
wherein said first resilient member portion of said plurality of resilient member portions is radially separated from said base portion by said space to allow radial movement of said first resilient member portion into said space in response to the force being applied to each resilient member portion, said space bounded only by radial interior surfaces of said first resilient member portion, said outermost radial surface of said base portion, a first circumferential outer surface of said first support portion at a first circumferential end of said space and a second circumferential outer surface of said second support portion at a second circumferential end of said space; and
wherein said first support portion comprises a first support engagement surface and said second support portion comprises a second support engagement surface, said first support engagement surface and said second support engagement surface extending further radially outwardly than said first resilient member portion.

16. A method of controlling radial forces between first and second concentric components, comprising:
elastically deforming a plurality of resilient member portions of a radial spring in a radial direction, the radial spring comprising a base portion having an axis, a plurality of support portions extending radially outwardly from the base portion, and a first resilient member portion of the plurality of resilient member portions extending from, and connected to, a first support portion and a second support portion of the plurality of support portion portions, the first support portion and the second support portion circumferentially separated from each other;
positioning the radial spring concentrically between the first and second concentric components; and
releasing at least a portion of the elastic deformation of the plurality of resilient member portions such that the plurality of resilient member portions engage one of the first and second concentric components and the base portion engages the other of the first and second concentric components as compared to the resilient member portions; and
wherein the first support portion comprises a first support engagement surface and the second support portion comprises a second support engagement surface, the first support engagement surface and the second support engagement surface extending further radially outwardly than the first resilient member portion; and
wherein each support portion of said plurality of support portions is circumferentially bounded by opposite circumferential outer surfaces of said base portion.

17. The method of claim 16 wherein a first resilient member portion of the plurality of resilient member portions comprises a resilient member portion engagement surface engaging the second component, the resilient member portion engagement surface extending radially outwardly from the first resilient member, and located between the first support portion and the second support portion.

18. A radial spring for controlling radial forces between first and second concentric components, comprising:
a base portion;
a plurality of support portions extending radially outwardly;
a first resilient member portion of a plurality of resilient member portions extending from a first support portion to a second support portion of the plurality of support portions, said plurality of resilient member portions formed monolithically relative to said base portion and said plurality of support portions; and
wherein the base portion, the at least one support portion and the plurality of resilient member portions are formed about an axis, and wherein the plurality of resilient member portions are resiliently deformable along a radial direction with respect to the axis to exert an opposing radial force in response to a force causing a deformation;
wherein a first support portion of said plurality of support portions comprises a first support engagement surface and a second support portion of said plurality of support portions comprises a second support engagement surface, said first support engagement surface and said second support engagement surface extending further radially outwardly than said first resilient member portion; and
wherein each support portion of said plurality of support portions is circumferentially bounded by opposite circumferential outer surfaces of said base portion.

* * * * *